US011211828B2

(12) United States Patent
Taniguchi

(10) Patent No.: US 11,211,828 B2
(45) Date of Patent: Dec. 28, 2021

(54) EFFICIENT WIRELESS POWER FEEDING APPARATUS AND METHOD

(71) Applicant: KABUSHIKI KAISHA TOSHIBA, Tokyo (JP)

(72) Inventor: Kentaro Taniguchi, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 9 days.

(21) Appl. No.: 16/816,169

(22) Filed: Mar. 11, 2020

(65) Prior Publication Data

US 2021/0075267 A1 Mar. 11, 2021

(30) Foreign Application Priority Data

Sep. 6, 2019 (JP) .............................. JP2019-163215

(51) Int. Cl.
*H02J 50/20* (2016.01)
*H02J 50/40* (2016.01)
*H02J 50/80* (2016.01)
*H04W 4/80* (2018.01)

(52) U.S. Cl.
CPC .............. *H02J 50/20* (2016.02); *H02J 50/40* (2016.02); *H02J 50/80* (2016.02); *H04W 4/80* (2018.02)

(58) Field of Classification Search
CPC ............ H02J 50/20; H02J 50/40; H02J 50/80; H04W 4/80
USPC ....................................................... 307/104
See application file for complete search history.

(56) References Cited

U.S. PATENT DOCUMENTS

| | | | |
|---|---|---|---|
| 2008/0309452 A1 | 12/2008 | Zeine | |
| 2009/0286475 A1* | 11/2009 | Toncich | H02J 50/90 455/41.1 |
| 2010/0315045 A1 | 12/2010 | Zeine | |
| 2013/0058379 A1* | 3/2013 | Kim | B60L 53/36 375/146 |
| 2013/0162051 A1* | 6/2013 | Michihata | H02J 50/80 307/104 |
| 2018/0091002 A1* | 3/2018 | Park | H02J 50/80 |
| 2018/0145544 A1* | 5/2018 | Park | H04W 4/80 |
| 2019/0157912 A1* | 5/2019 | Taniguchi | H02J 50/23 |
| 2019/0252919 A1* | 8/2019 | Ogawa | H02J 50/80 |
| 2019/0280532 A1* | 9/2019 | Matsuo | H02J 50/402 |
| 2020/0052530 A1* | 2/2020 | Adachi | H02J 50/80 |
| 2020/0359381 A1* | 11/2020 | Park | H04B 5/0031 |
| 2021/0067200 A1* | 3/2021 | Taniguchi | H02J 50/10 |

FOREIGN PATENT DOCUMENTS

JP 5738416 B2 8/2011

* cited by examiner

*Primary Examiner* — William Hernandez
(74) *Attorney, Agent, or Firm* — Holtz, Holtz & Volek PC

(57) ABSTRACT

According to one embodiment, an electronic apparatus for feeding power to an electronic device by an electromagnetic wave in a first frequency band, includes a receiver and a transmitter. The receiver receives a beacon from the electronic device via at least a part of the first frequency band. The beacon includes an unmodulated signal at least partly. The transmitter transmits a first electromagnetic wave for feeding power to the electronic device via the first frequency band based on the beacon. A time length of the beacon is different from a time length of the first electromagnetic wave.

16 Claims, 15 Drawing Sheets

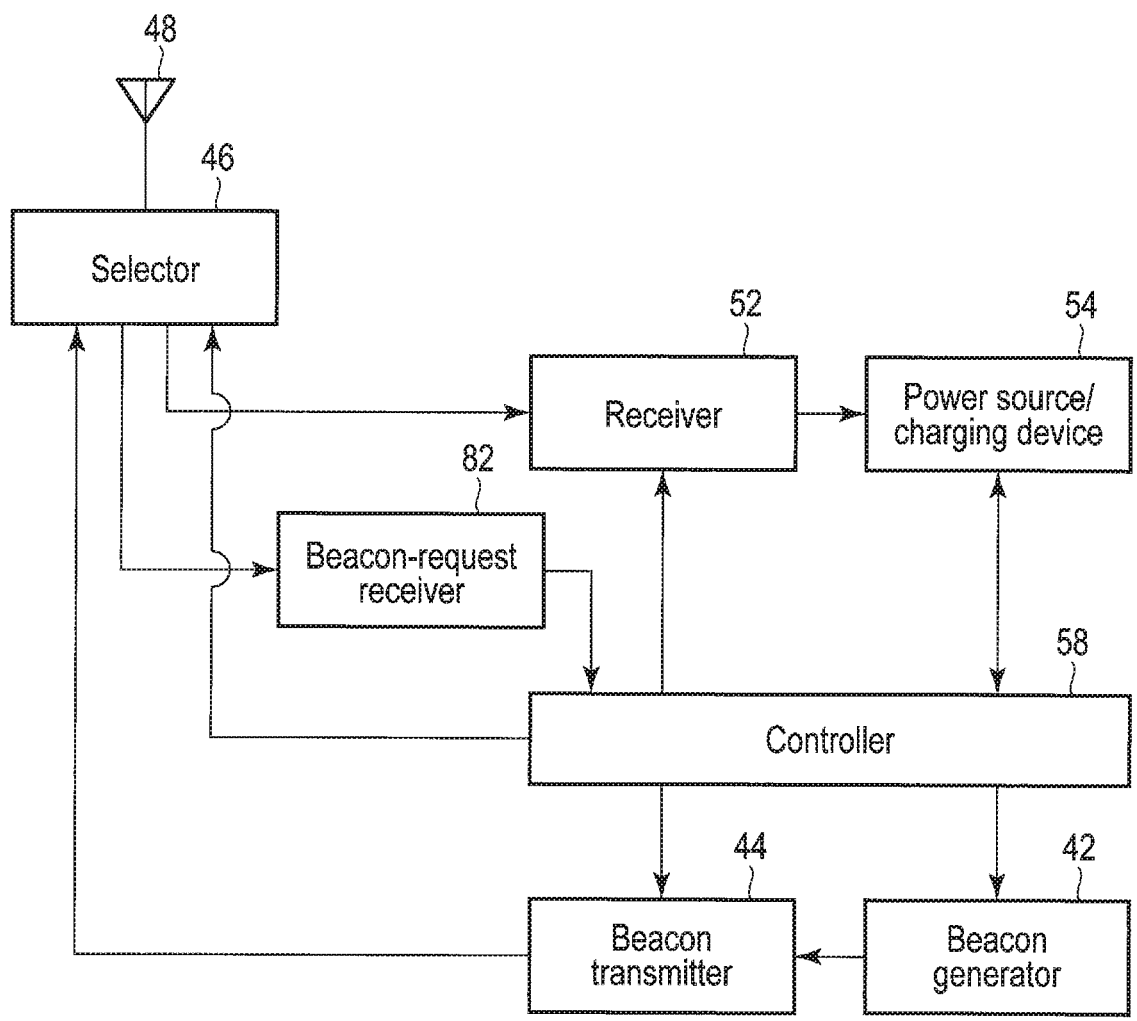
F I G. 9

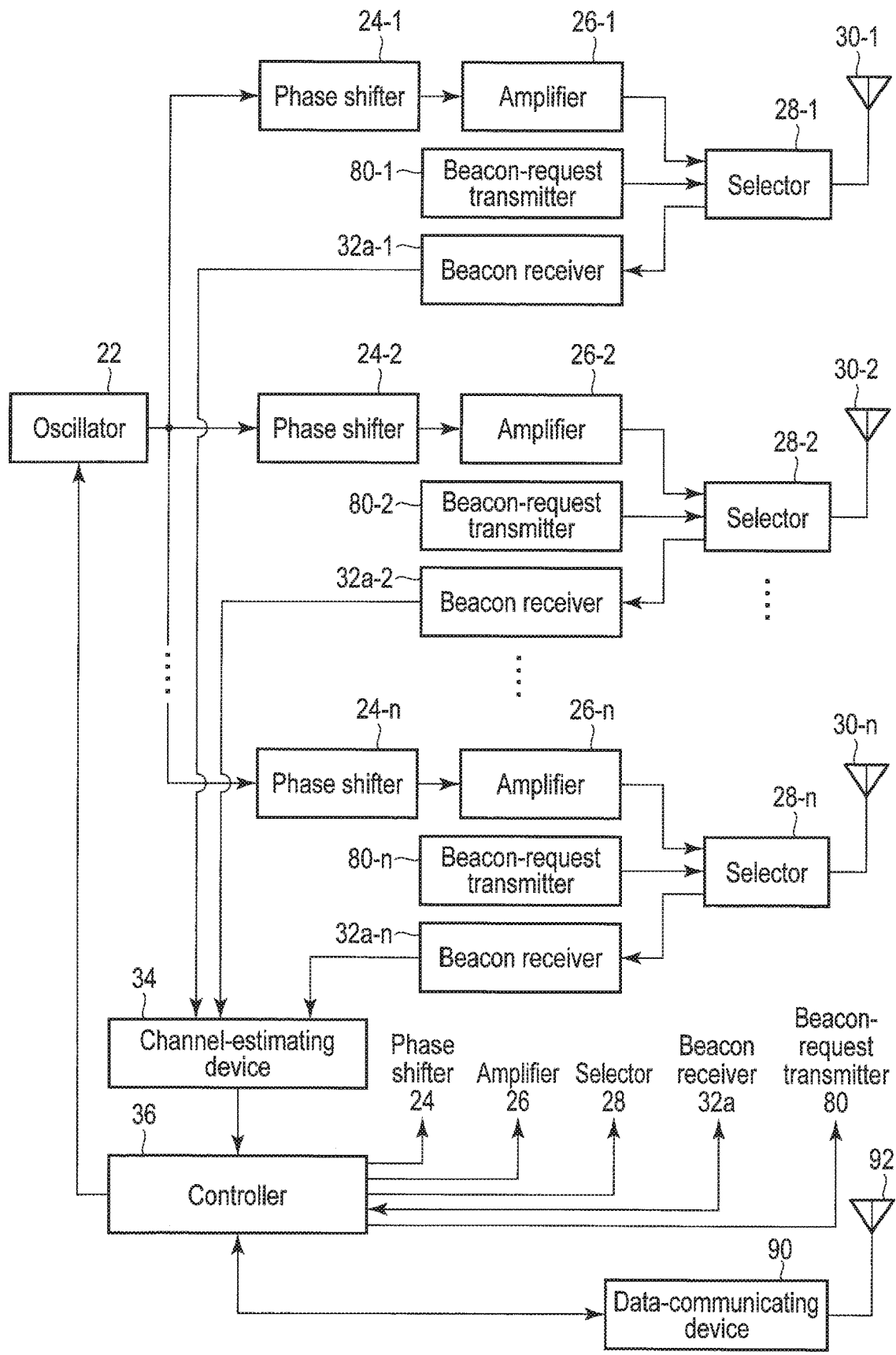
F I G. 13

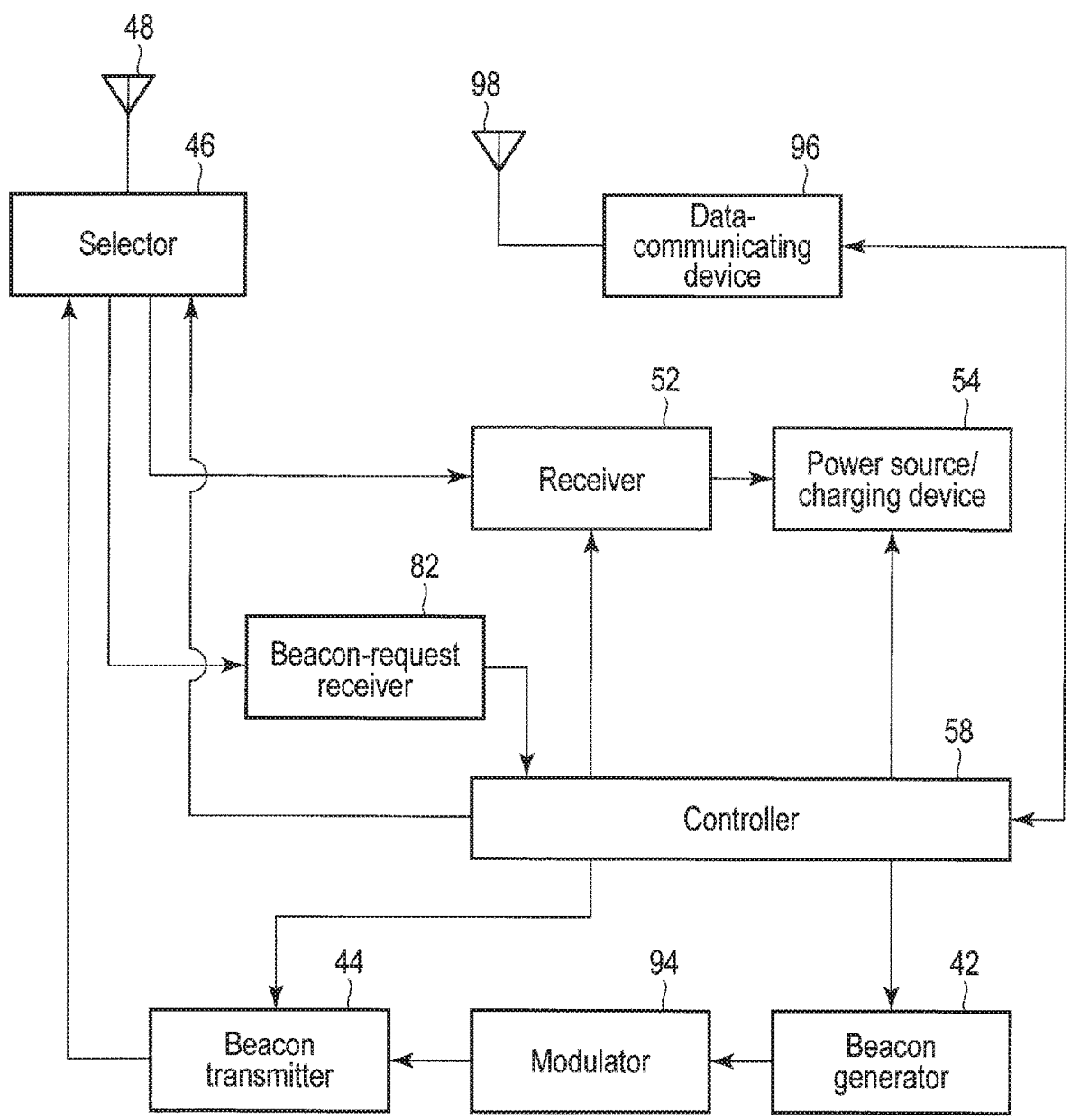
F I G. 14

EFFICIENT WIRELESS POWER FEEDING APPARATUS AND METHOD

CROSS-REFERENCE TO RELATED APPLICATIONS

This application is based upon and claims the benefit of priority from Japanese Patent Application No. 2019-163215, filed Sep. 6, 2019, the entire contents of which are incorporated herein by reference.

FIELD

Embodiments described herein relate generally to an electronic apparatus and a method for performing power transmission using an electromagnetic wave.

BACKGROUND

A power-feeding device feeds power by forming a beam of an electromagnetic wave for feeding power (hereinafter referred to as a power-feeding beam) to one or more power-receiving devices located in a power-feeding area. In order to perform efficient power feeding, the power-feeding device estimates a wireless channel between the power-feeding device and the power-receiving device, and forms a power-feeding beam having a beam pattern based on channel characteristics. For this purpose, the power-feeding device correctly estimates the wireless channel. In a known method of estimating the wireless channel, a continuous wave (also referred to as an unmodulated signal) in the same frequency band as the power-feeding beam is used. Such an unmodulated signal for estimating wireless channel is also referred to as a beacon.

The beacon is transmitted in at least a part of the frequency band of the power-feeding beam. If there are power-feeding devices, and power is fed from a first power-feeding device to a first power-receiving device, the first power-feeding device that receives a beacon from the first power-receiving device may receive a power-feeding beam from the second power-feeding device adjacent thereto or also a reflected wave thereof. In this case, due to interference between the power-feeding beam from the adjacent second power-feeding device or reflected waves thereof with the beacon, the first power-feeding device may not be able to distinguish the two beams. As a result, estimation of the wireless channel becomes inaccurate, and efficient power feeding may not be performed.

In order to solve this problem, it is conceivable that the adjacent power-feeding devices are configured to transmit power-feeding beams of different frequency bands. However, in this case, a range of frequency occupied by the entire power-feeding system is expanded and the utilization efficiency of the frequency band is lowered. Further, it is complicated to adjust how much the ranges of frequency are to be differentiated among the adjacent power-feeding devices, where to dispose the power-feeding devices, and how far the power-feeding devices are separated from each other.

BRIEF DESCRIPTION OF THE DRAWINGS

FIG. 9 is a block diagram illustrating an example of a power-receiving device in the wireless power-feeding system according to the second embodiment.

FIG. 13 is a block diagram illustrating an example of a power-feeding device in a wireless power-feeding system including an electronic apparatus according to a third embodiment.

FIG. 14 is a block diagram illustrating an example of a power-receiving device in the wireless power-feeding system according to the third embodiment.

DETAILED DESCRIPTION

Figure 1:
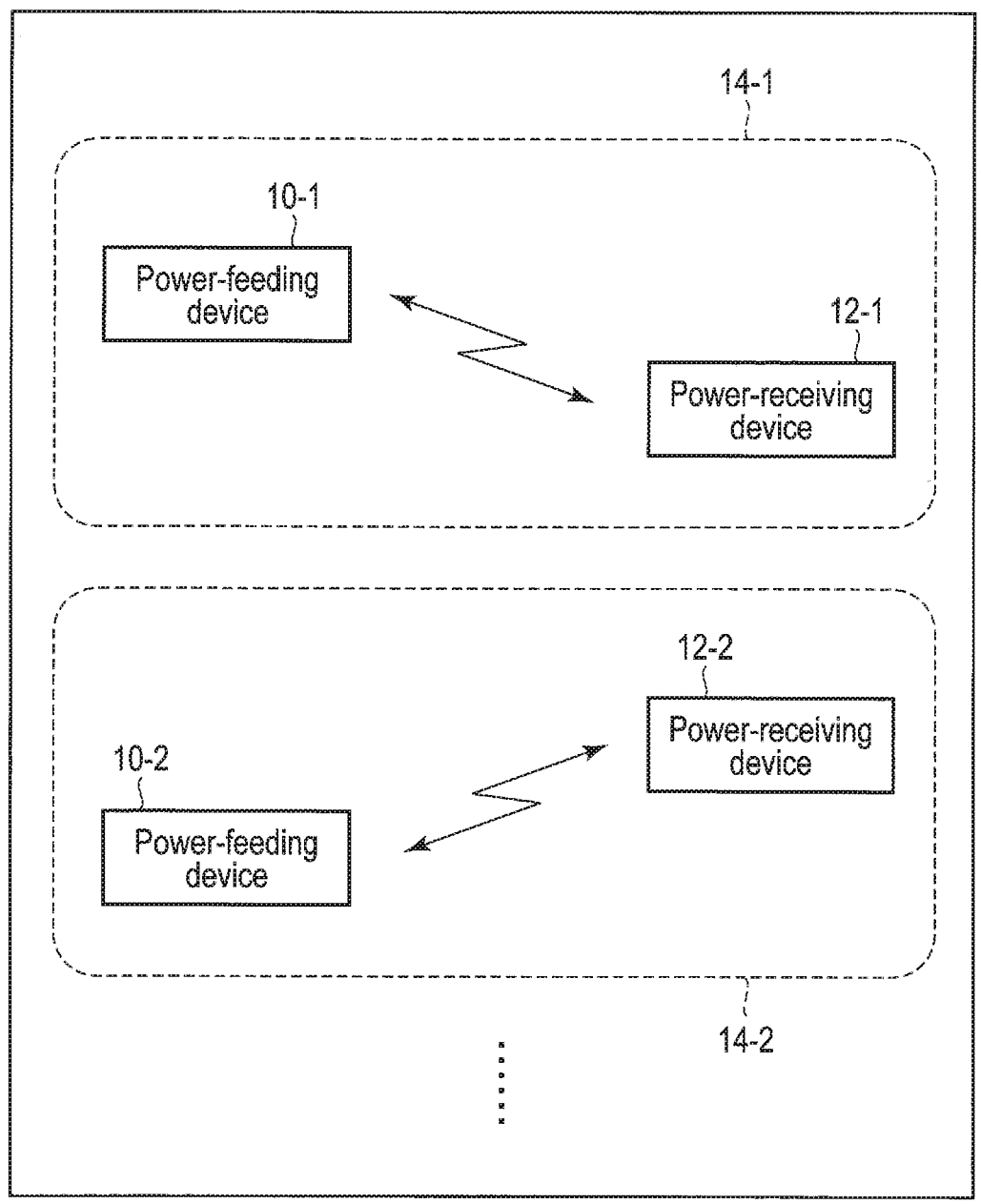
FIG. 1 is a block diagram illustrating an example of a wireless power-feeding system including an electronic apparatus according to a first embodiment.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, an electronic apparatus for feeding power to an electronic device by an electromagnetic wave in a first frequency band, includes a receiver and a transmitter. The receiver receives a beacon from the electronic device via at least a part of the first frequency band. The beacon includes an unmodulated signal at least partly. The transmitter transmits a first electromagnetic wave for feeding power to the electronic device via the first frequency band based on the beacon. A time length of the beacon is different from a time length of the first electromagnetic wave.

Hereinafter, embodiments will be described with reference to the drawings. The following description exemplifies an apparatus and method for embodying a technical idea of the embodiments, and the technical ideas of the embodiments are not limited to structures, shapes, arrangements, and materials of the components described below. Variations readily conceivable by those skilled in the art are naturally included in the scope of the disclosure. In order to make the description clearer, in the drawings, the size, thickness, planar dimension, shape, or the like of each component may be schematically expressed by changing them from the actual embodiment. In a plurality of drawings, components having different dimensional relationships and ratios may also be included. In a plurality of drawings, corresponding elements may be denoted by the same reference numerals, and redundant description may be omitted. Although some components may be given a plurality of designations, these exemplified designations are merely examples and does not deny giving other designations to these components. Moreover, they do not deny giving other designations to components to which a plurality of designations are not assigned. As used herein the term "connection" is intended to mean not only a direct connection but also an indirect connection via other components.

First Embodiment (Wireless Power-Feeding System)

FIG. 1 is a block diagram illustrating an example of a wireless power-feeding system including a power-feeding device, which is an example of an electronic apparatus according to a first embodiment. The wireless power-feeding system includes power-feeding devices 10-1, 10-2, . . . (collectively referred to as "power-feeding device 10") and power-receiving devices 12-1, 12-2, . . . (collectively referred to as "power-receiving device 12"). Power feeding areas 14-1, 14-2, . . . (collectively referred to as "power-feeding area 14") are assigned to the power-feeding devices 10-1, 10-2, . . . . The power-feeding devices 10-1, 10-2, . . . can feed power respectively to power-receiving devices 12-1, 12-2, . . . , located in the power-feeding areas 14-1, 14-2, . . . by power-feeding beams. Power receiving devices 12 may be present in each power-feeding area 14. In this case, the power-receiving devices 12 in each power-feeding area 14 transmit beacons in a determined order during a predetermined period. The power-feeding devices 10 may transmit power-feeding beams to the power-receiving devices 12 during a predetermined period in a predetermined order after the reception of the beacons.

For example, a microwave band is used as a frequency band of the power-feeding beam. The microwave band in a broad sense is a frequency band of 300 MHz to 3 THz (wavelength from 0.1 mm to 1 m), and in a narrow sense is 3 to 30 GHz (wavelength from 1 to 10 cm), and a frequency band of 5.7 GHz may be exemplified. For this reason, the power-feeding device 10 is also referred to as a microwave power-feeding device. For example, a transmission power of the power-feeding device 10 is 100 W at the maximum, the e.i.r.p. (equivalent isotropic radiated power) is 10 kW, at least a part of the power-feeding beam includes an unmodulated signal of a continuous wave, and a bandwidth of the power-feeding beam is less than 100 kHz.

The power-receiving device 12 transmits a beacon to the power-feeding device 10 via at least a part of the frequency band of the power-feeding beam. At least a part of the beacon includes an unmodulated signal of a continuous wave. If the power-receiving devices 12-1, 12-2, . . . are present in the power-feeding area 14, a timing of the transmission of the beacon and a timing of receiving of the power may be determined for each of the power-receiving devices 12-1, 12-2, . . . . Power feeding beams may be transmitted equally to the power-receiving devices 12-1, 12-2, . . . , or the allocation ratio of the transmission destinations (power-receiving devices 12-1, 12-2, . . . ) of the power-feeding beams may be changed at a ratio according to the power required by each of the power-receiving devices 12-1, 12-2, . . . .

The power-feeding device 10 estimates a wireless channel from the received beacon and forms a power-feeding beam having a beam pattern according to channel characteristics.

In the first embodiment, in order to prevent interference between the power-feeding beam and the beacon, the transmission time length of the power-feeding beam (hereinafter simply referred to as "time length") and the time length of the beacon are different. The time length of the power-feeding beam is set to be not less than a first time length but less than a second time length, and the time length of the beacon is set to be less than the first time length or not less than the second time length. For example, the first time length is set to 1 millisecond, and the second time length is set to 100 milliseconds. If the time length of the power-feeding beam is within these ranges, it does not need to be fixed, and may vary at every transmission. If the time length of the beacon is also within these ranges, it does not need to be fixed, and may vary at every transmission.

Even if the frequency band of the beacon and the power-feeding beam are the same or nearly the same, the power-feeding device 10 can identify based on the reception time length of the electromagnetic wave whether it has received the beacon, the power-feeding beam from the adjacent power-feeding device 10, or the reflected wave thereof. For this reason, the interference between the power-feeding beam and the beacon can be prevented based on the reception time length of the electromagnetic wave. Therefore, the frequency bands of the power-feeding beams from the adjacent power-feeding devices 10 may be the same or may be different.

(Power-Feeding Device)

Figure 2:
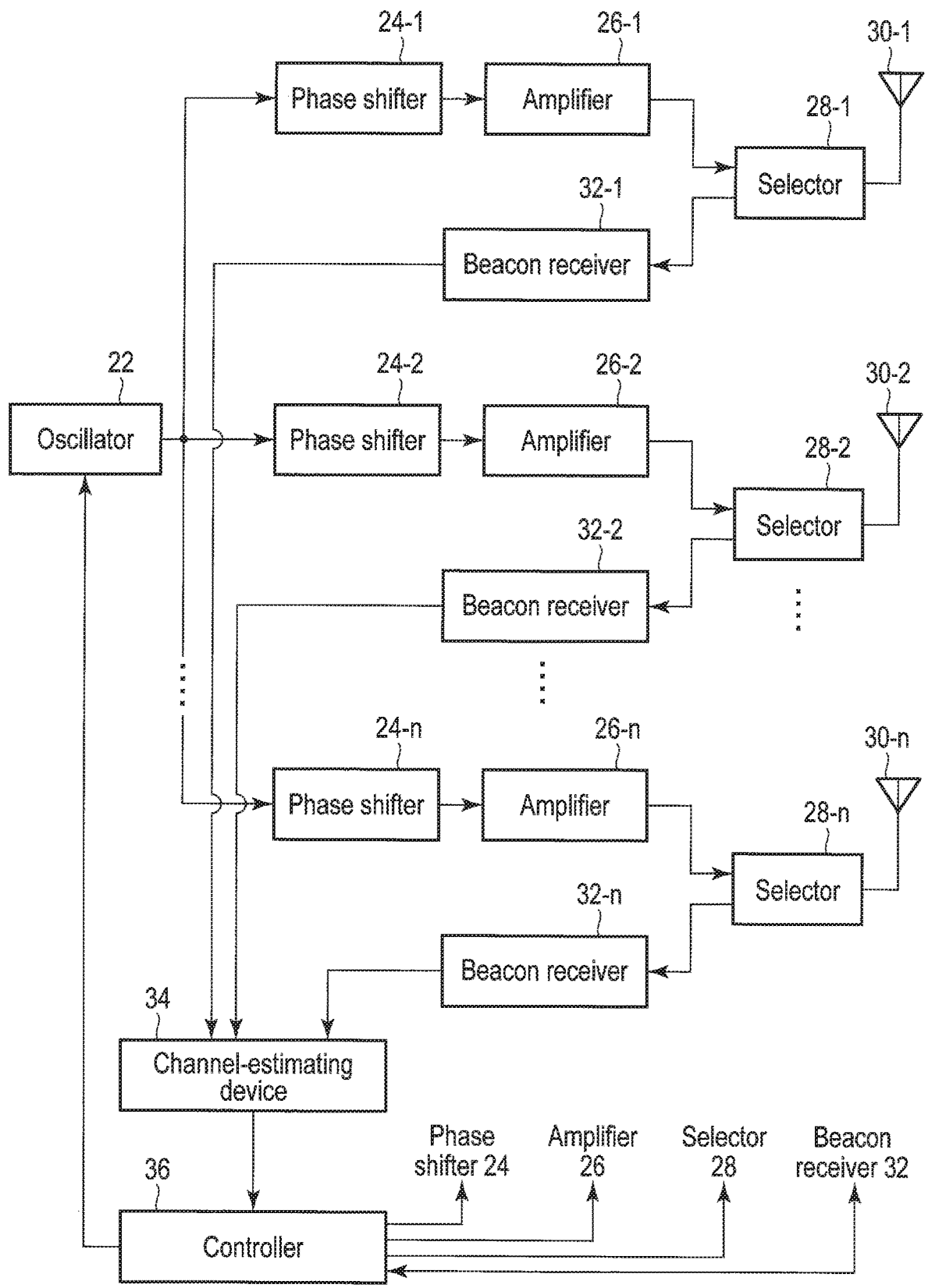
FIG. 2 is a block diagram illustrating an example of a power-feeding device in the wireless power-feeding system according to the first embodiment.

FIG. 2 is a block diagram illustrating an example of the power-feeding device 10. Radio frequency signals (RF signals) output from an oscillator 22 are input to phase shifters 24-1, 24-2, . . . 24-n (collectively referred to as "phase shifter 24"). Amounts of phase shift of the phase shifters 24-1, 24-2, . . . , 24-n are controlled by control signals from a controller 36, respectively. Outputs from the phase shifters 24-1, 24-2, . . . 24-n are input to amplifiers 26-1, 26-2, . . . 26-n (collectively referred to as "amplifier 26"). Amplification factors of the amplifiers 26-1, 26-2, . . . 26-n are controlled by the control signals from the controller 36, respectively. Outputs from the amplifiers 26-1, 26-2, . . . 26-n are input to antennas 30-1, 30-2, . . . 30-n (collectively referred to as "antenna 30") through selectors 28-1, 28-2, . . . 28-n (collectively referred to as "selector 28"). The antennas 30-1, 30-2, . . . 30-n constitute an array antenna. For example, sixty-four (=8×8) antennas 30 are two-dimensionally arrayed to constitute a phased array antenna. The amplitude and phase of the RF signal fed to each of the antennas 30-1, 30-2, . . . 30-n are controlled by the controller 36. The antennas 30 radiates a power-feeding beam having a desired beam pattern.

The controller 36 also controls transmission/reception switching of the selector 28. The controller 36 switches the selector 28 to the transmitting side and controls the oscillator 22, the phase shifter 24, and the amplifier 26, so that the power-feeding device 10 can radiate a power-feeding beam having an efficient beam pattern to the power-receiving device 12. Further, the controller 36 may control a frequency band and an operation time of the oscillator 22 to control the frequency band of the power-feeding beam, the time length of the power-feeding beam, and the like.

When the controller 36 switches the selector 28 to the receiving side, the signals received by the antenna 30 are input to Beacon receivers 32-1, 32-2, . . . 32-n (collectively referred to as "Beacon receiver 32"). The Beacon receiver 32 and the controller 36 are connected to each other, and signals are fed to each other. The operation of the Beacon receiver 32 is controlled by the controller 36.

The output from the Beacon receiver 32 is input to the channel-estimating device 34 and the controller 36. The channel-estimating device 34 can estimate electromagnetic wave wireless channels between each of the antennas 30-1, 30-2, . . . 30-n and the power-receiving device 12 from at least one of the amplitude and the phase of the beacons received by the antennas 30-1, 30-2, . . . 30-n. The estimated channel characteristics are input to the controller 36.

The pattern of the power-feeding beam radiated from the antenna 30 is based on at least one of the phase and amplitude of the signal fed to the antenna 30. Therefore, based on the estimated channel characteristics, the controller 36 controls at least one of the phase shift amount of each of the phase shifters 24-1, 24-2, . . . 24-n and the amplification factor of each of the amplifiers 26-1, 26-2, . . . 26-n based on the estimated channel characteristics. Therefore, the power-feeding beam having a beam pattern corresponding to the channel characteristics is transmitted to the power-receiving device 12.

For example, it is assumed that a beacon received by the antenna 30-i (i=1 to n) is expressed by $A_i \times e^{j\theta_i} \times CW$ (where Ai is the amplitude, θi is the phase, and CW is the continuous wave) and the amplitude Ai and the phase θi are known. A power-feeding beam having a beam pattern that cancels the characteristics of the wireless channel can be formed.

Although the antenna 30 is commonly used for power-feeding beam transmission and beacon reception, dedicated antennas may be used for power-feeding beam transmission and beacon reception, separately. If dedicated antennas are used for power-feeding beam transmission and beacon reception, power-feeding beam transmission and beacon reception can be performed simultaneously.

(Power-Receiving Device)

Figure 3:
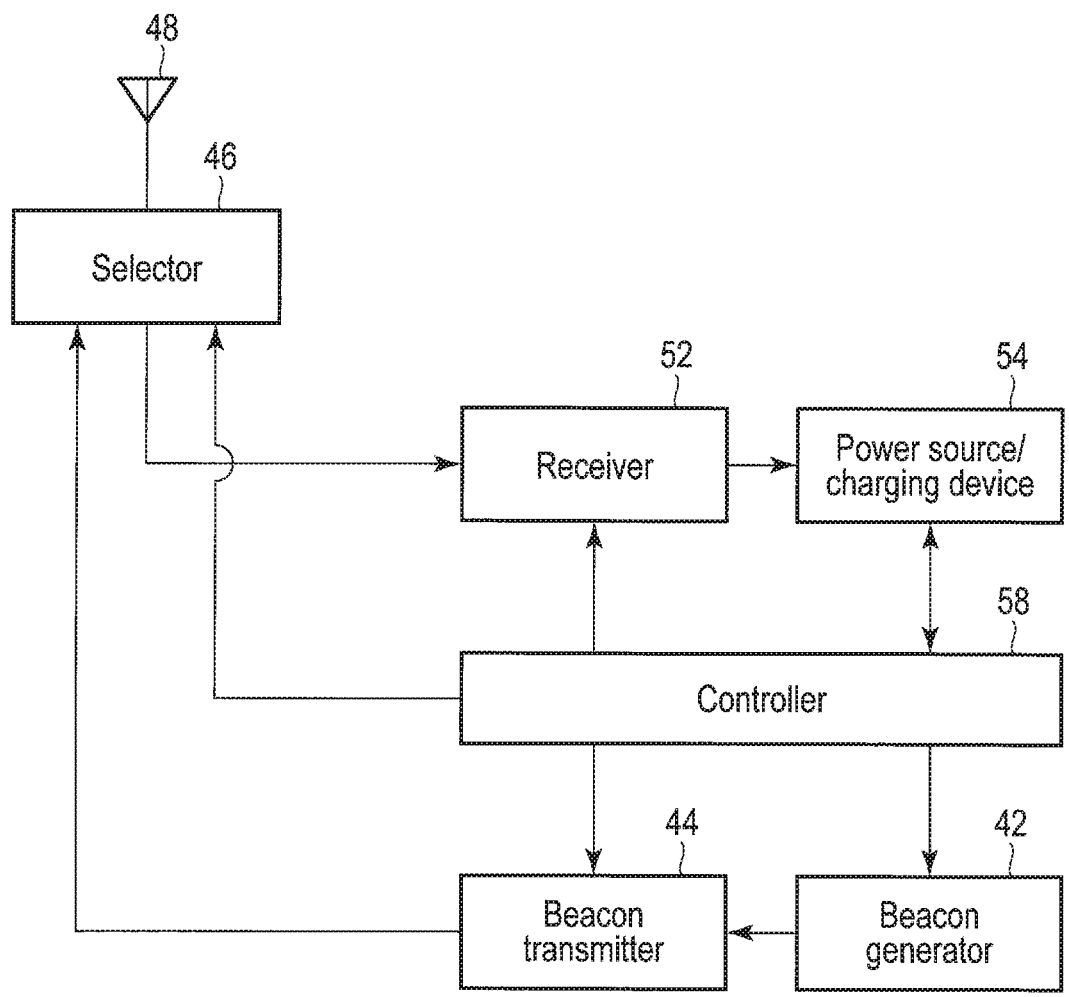
FIG. 3 is a block diagram illustrating an example of a power-receiving device in the wireless power-feeding system according to the first embodiment.

FIG. 3 is a block diagram illustrating an example of the power-receiving device 12. The Beacon generator 42 includes an oscillator and generates a continuous wave beacon in the same frequency band as the frequency band of the power-feeding beam. The beacon is radiated from an antenna 48 via a beacon transmitter 44 and a selector 46. The beacon may be omnidirectional (radiated in all directions) or may be a beam pattern in a specific direction like a power-feeding beam. In the first embodiment, the beacon transmitter 44 does not have a modulation function, and the beacon is an unmodulated signal. A controller 58 controls operations of the beacon generator 42, the beacon transmitter 44, and the selector 46.

The power-receiving device 12 may periodically transmit the beacon or autonomously determine the transmission timing. For example, the power-receiving device 12 may have a function of comparing the amount of power fed from the power-feeding device 10 with the remaining amount of its own battery. If the power-receiving device 12 determines that the power-feeding amount is insufficient, a wireless channel between the power-feeding device 10 and the power-receiving device 12 may have been changed. Therefore, the power-receiving device 12 may transmit the beacon to the power-feeding device 10 so that the power-feeding device 10 changes the pattern of the power-feeding beam.

If the antenna 48 receives the power-feeding beam, power is fed from the receiver 52 to the power source/charging device 54. A load (for example, a sensor) or a rechargeable battery, not illustrated, is connected to the power source/charging device 54, and power is fed to the load, or the rechargeable battery is charged. If only the power source device is used instead of the power source/charging device, the receiver 52 may have a rectifying function, convert AC power from the intermittent power-feeding beam into DC power so that the DC power is fed to the load. The controller 58 also controls operations of the receiver 52 and the power source/charging device 54.

Although the antenna 48 is commonly used for power-feeding beam reception and beacon transmission, dedicated antennas may be used for power-feeding beam reception and beacon transmission, separately. If dedicated antennas are used for power-feeding beam reception and beacon transmission, power-feeding beam reception and beacon transmission can be performed simultaneously.

(Operation Example of Power Feeding)

Figure 4:
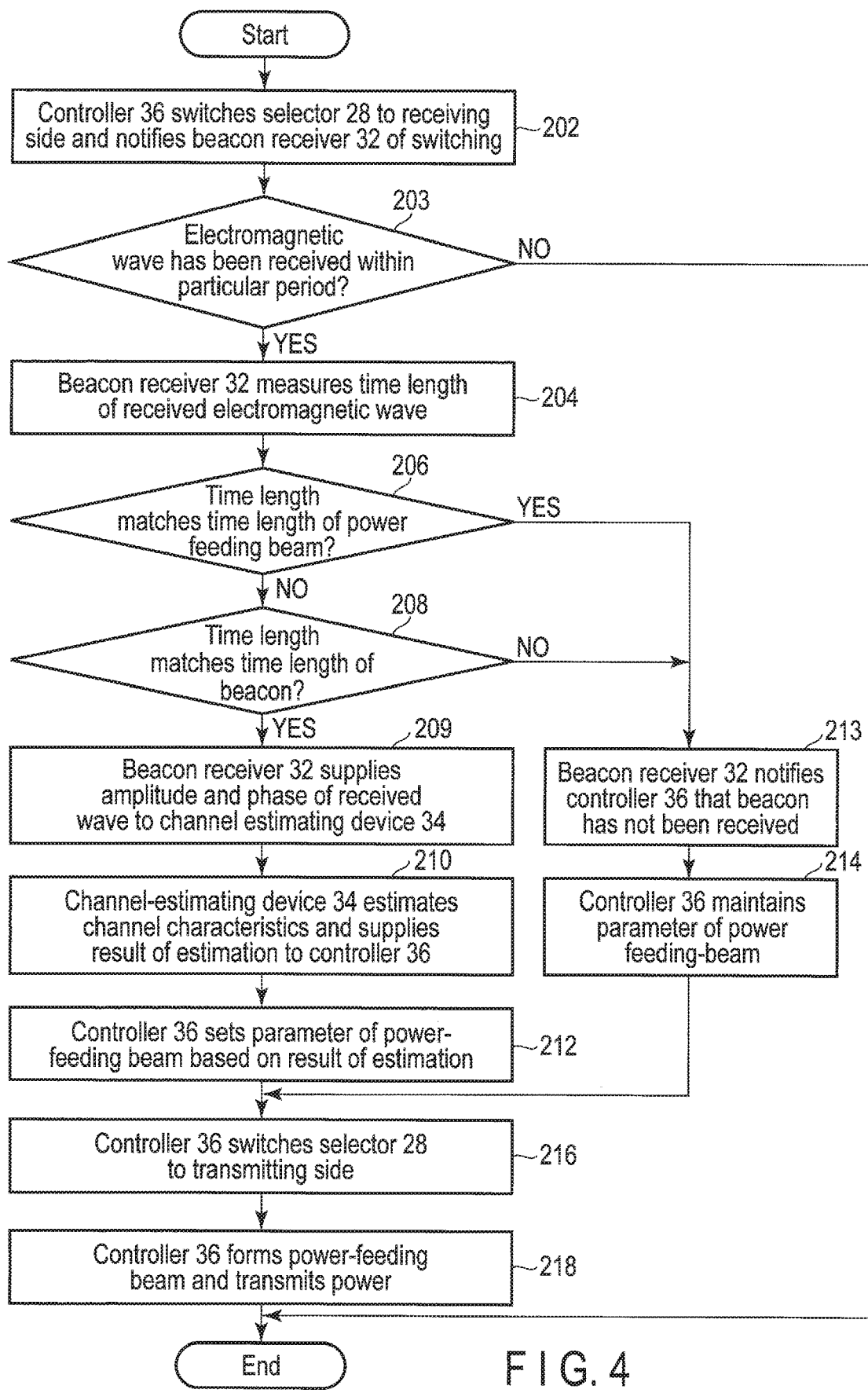
FIG. 4 is a flowchart illustrating an operation example of the power-feeding device.

An example of power feeding will be described with reference to FIG. 4. FIG. 4 is a flowchart illustrating an example of a processing flow of the power-feeding device 10. Here, as an application example of the power-feeding system, a manufacturing factory system is assumed. In a manufacturing factory, various sensors such as a temperature sensor, a pressure sensor, and the like that are operated by a rechargeable battery are attached to a manufacturing line. A power-feeding device is provided on a ceiling or the like of the manufacturing factory to charge wirelessly the various sensors. The power-receiving device 12 may have a function of measuring or predicting the remaining amount of the battery and send a beacon to the power-feeding device 10 when reception of power-feeding is necessary or may transmit a beacon to the power-feeding device 10 irrespective of the state of the power-receiving device 12. In the latter case, the power source/charging device 54 of the power-receiving device 12 may include a safety circuit so that the power-receiving device 12 does not fail even if it receives more power than necessary.

In step 202, the controller 36 switches the selector 28 to the receiving side and notifies the beacon receiver 32 that the selector 28 is switched to the receiving side. Subsequently, if a beacon is radiated from the power-receiving device 12, the beacon receiver 32 receives the beacon, and if a power-feeding beam that is a continuous wave from the adjacent power-feeding device 10 is radiated and/or the reflected wave thereof is present, the beacon receiver 32 receives the radiated power-feeding beam and the reflected wave.

In step 203, the beacon receiver 32 determines whether a continuous electromagnetic wave has been received within a particular period after the selector 28 is switched to the receiving side.

If the beacon receiver 32 has not received the continuous electromagnetic wave within the particular period after the selector 28 is switched to the receiving side (if the determination result in step 203 is NO), the process ends. Subsequently, step 202 is executed at an appropriate timing.

If the beacon receiver 32 has received the continuous electromagnetic wave within the predetermined time after the selector 28 is switched to the receiving side (if the determination result in step 203 is YES), the beacon receiver 32 measures the time length of the received electromagnetic wave in step 204.

In step 206, the beacon receiver 32 determines whether the time length of the received electromagnetic wave matches the time length of the power-feeding beam. If the time length of the received electromagnetic wave matches the time length of the power-feeding beam (if the determination result of step 206 is YES), the beacon receiver 32 determines that the electromagnetic wave is a power-feeding beam, and notifies the controller 36 that the beacon has not been received in step 213. Receiving the notification that the beacon has not been received, the controller 36 maintains parameters (phase and amplitude) that determine the beam pattern of the power-feeding beam in step 214. That is, no signal is input to the channel-estimating device 34, and estimation of the wireless channel characteristic is not performed. A beam pattern formed based on the previously estimated characteristics of a wireless channel is maintained.

If the time length of the received electromagnetic wave does not match the time length of the power-feeding beam (if the determination result in step 206 is NO), the beacon receiver 32 determines in step 208 whether the time length of the received electromagnetic wave matches the time length of the beacon. If the time length of the received electromagnetic wave matches the time length of the beacon (the determination result in step 208 is YES), the beacon receiver 32 estimates that the received electromagnetic wave is a beacon. In step 209, the beacon receiver 32 supplies data of the amplitude and phase, which are parameters necessary for wireless channel estimation of the parameters of the received beacon, to the channel-estimating device 34. In step 210, the channel-estimating device 34 estimates channel characteristics and supplies the result of estimation to the controller 36. In step 212, the controller 36 sets a parameter (at least one of the phase and the amplitude) that determines the pattern of the power-feeding beam based on the result of estimation.

If the time length of the received electromagnetic wave does not match the time length of the beacon (if the determination result of step 208 is NO), the beacon receiver 32 estimates that the received electromagnetic wave is not a beacon and notifies the controller 36 of the fact that the beacon has not been received in step 213. Then, the controller 36 maintains parameters (the phase and the amplitude) that determine the beam pattern of the power-feeding beam in step 214.

After step 212 or 214, the controller 36 switches the selector 28 to the transmission side in step 216. In step 218, the controller 36 controls at least one of the phase shift amount of each of the phase shifters 24-1, 24-2, . . . 24-n and the amplification factor of each of the amplifiers 26-1, 26-2, . . . 26-n based on the parameters which determine the pattern of the power-feeding beam. Therefore, the controller 36 forms a power-feeding beam having a beam pattern corresponding to the estimated channel characteristics or a power-feeding beam having the same beam pattern as the beam pattern in the past and transmits power to the power-receiving device 12.

Note that the identification of the beacon in FIG. 4 is performed by using both of the time length of the power-feeding beam (step 206) and the time length of the beacon (step 208) on the assumption that both the time length of the power-feeding beam and the time length of the beacon are known. However, if only one of them is known, only one of decision step 206 and step 208 using the known time length is performed. Moreover, even if both the time length of the power-feeding beam and the time length of the beacon are known, identification may be performed by using only either one of these time lengths.

If only step 206 is performed, if the time length of the received electromagnetic wave does not match the time length of the power-feeding beam, it is determined that the received electromagnetic wave is a beacon, and step 209 is executed. If only step 208 is performed, if the time length of the received electromagnetic wave matches the time length of the beacon, it is determined that the received electromagnetic wave is a beacon, and step 209 is executed.

Further, if it is determined that the beacon is interfered by the power-feeding beam of another power-feeding device, that is, if the determination result of step 206 is YES or the determination result of step 208 is NO, power is fed without changing the power-feeding pattern (amplitude and phase) as described in step 214. However, power may be fed by a power-feeding beam having other predetermined beam patterns or may not be fed.

Figure 5A:
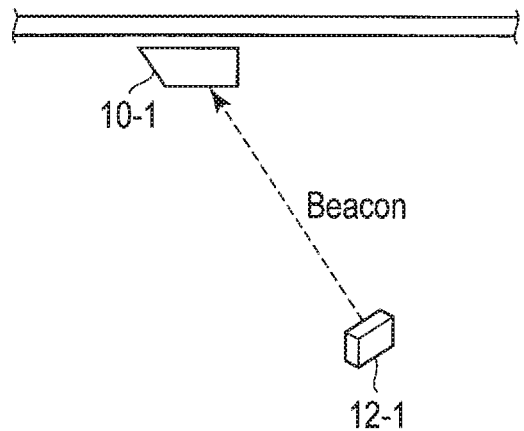
FIGS. 5A and 5B are drawings illustrating one aspect of wireless power feeding according to the first embodiment.
Figure 5B:
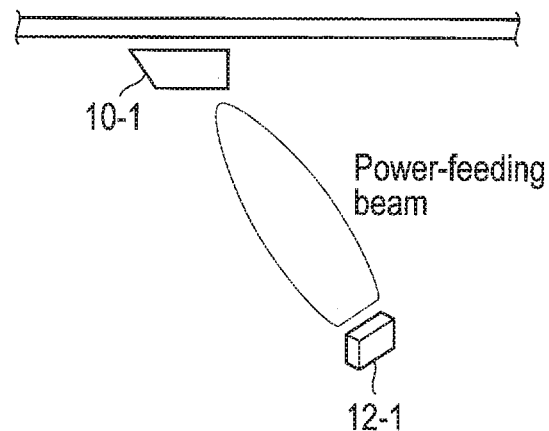

FIGS. 5A and 5B illustrate one aspect of power feeding according to the embodiment. As illustrated in FIG. 5A, the power-feeding device 10-1 receives the beacon from the power-receiving device 12-1 and estimates a wireless channel characteristic between the power-feeding device 10-1 and the power-receiving device 12-1. Based on the result of estimation, as illustrated in FIG. 5B, the power-feeding device 10-1 controls the beam pattern of the power-feeding beam toward the power-receiving device 12-1.

Radiation of the power-feeding beam from the power-feeding device 10-1 continues for a predetermined time length, and then radiation is stopped. The predetermined time length may be not less than the first time length and less than the second time length, may be a fixed time length, or may be selected from optional time lengths that satisfy the condition of "not less than the first time length and less than the second time length". By limiting the time length of the power-feeding beam in this manner, interference with the beacon can be prevented, and interference caused by the power-feeding beam on other existing wireless communication systems can be reduced.

Since power-feeding is performed by an electromagnetic wave in the first frequency band, if there are other wireless communication systems that use the first frequency band or a frequency band in the vicinity of the first frequency band, the performance of other wireless communication systems may be degraded by the power-feeding beam. If the power feeding using the power-feeding beam is continued for a long time, other coexisting wireless communication systems may not be able to communicate.

However, if the time length during which the power-feeding device can continuously transmit the power-feeding beam is limited to a predetermined time length as in the embodiment, other wireless communication systems perform wireless communication at a time length other than the predetermined time length, so that the power-feeding system and other wireless communication systems can coexist. If the power-feeding beam is periodically transmitted at a predetermined time length, other wireless communication systems periodically perform wireless communication during a stop period from one transmission to the next transmission of the power-feeding beam.

The value of the power-feeding time (predetermined time length) and the power-feeding stop interval to stop power feeding may be determined based on the specifications of a wireless communication system assumed to be coexisted, or based on the specifications of the power-feeding system. Furthermore, the power-feeding device may be provided with a function of monitoring a wireless communication environment in the power-feeding area and a function of determining the presence or absence of other electromagnetic signals, a communication status, and the like to control the predetermined time length and power-feeding stop interval adaptively.

Figure 6A:
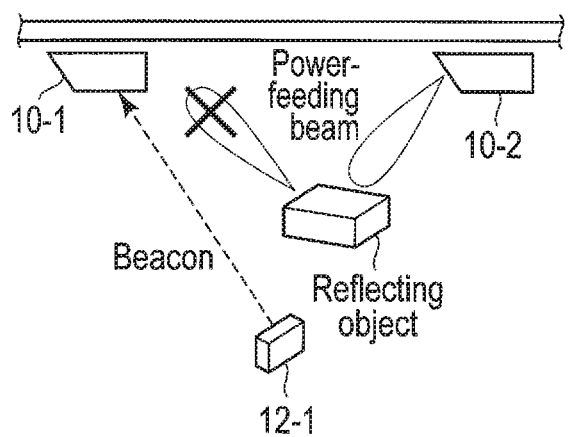
FIGS. 6A and 6B are drawings illustrating another aspect of the wireless power feeding according to the first embodiment.
Figure 6B:
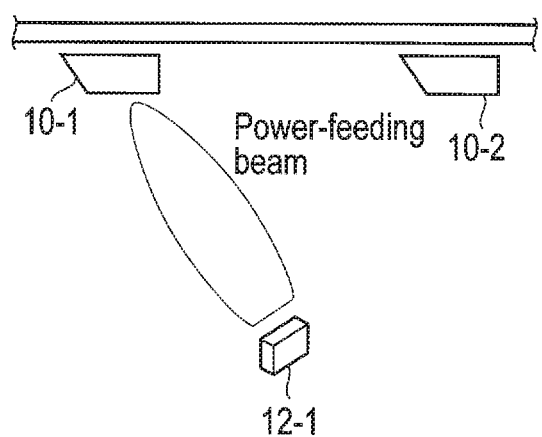

The beacon receiver 32 of the power-feeding device 10-1 receives a beacon transmitted from the power-receiving device 12-1 but may erroneously receive a power-feeding beam from adjacent power-feeding device 10-2 or the reflected wave thereof. This is because the beacon and the power-feeding beam are continuous waves in the same first frequency band. This situation is illustrated in FIGS. 6A and 6B. As illustrated in FIG. 6A, the beacon from the power-receiving device 12-1 and the reflected wave of the power-feeding beam from another power-feeding device 10-2 may be received by the power-feeding device 10-1 at the same timing or with a short time difference.

However, in the embodiment, the beacon receiver 32 of the power-feeding device 10-1 measures the time length of the received electromagnetic wave (continuous wave) in the first frequency band, and based on the result, determines whether the received electromagnetic wave is a beacon or a power-feeding beam radiated from another power-feeding device. If the power-feeding time length of the power-feeding beam is known, the beacon receiver 32 can identify whether the received electromagnetic wave is a beacon or a power-feeding beam by measuring the time length of the received electromagnetic wave. If the time length of the received electromagnetic wave matches the known feeding time length, the received electromagnetic wave is determined to be a power-feeding beam radiated from another power-feeding device. This received electromagnetic wave is not used for wireless channel estimation. Conversely, if the time length of the received electromagnetic wave does not match the known power-feeding time length, the beacon receiver 32 determines that the received electromagnetic wave is a beacon transmitted from the power-receiving device. This received electromagnetic wave is used for wireless channel estimation.

By performing such control, the power-feeding device 10 can determine whether the device 10 has correctly received a beacon or not and avoid the formation of a power-feeding beam with an incorrect beam pattern based on erroneous wireless channel estimation by the power-feeding beam.

Alternatively, as illustrated in the flowchart of FIG. 4, if the power-feeding device 10 recognizes the time length of the beacon together with the time length of the power-feeding beam, the power-feeding device 10 can more accurately determine whether or not the device 10 has correctly received the beacon or not. If the time length of the received electromagnetic wave does not match the time length of the power-feeding beam and the time length of the beacon, the beacon receiver 32 determines that there may be interference of the power-feeding beam from another power-feeding device, and does not perform wireless channel estimation. The beacon receiver 32 determines that the receiver 32 has correctly received the beacon only if the time length of the received electromagnetic wave matches the time length of the beacon, performs wireless channel estimation, and forms a power-feeding beam based on a result of estimation.

If the power-feeding device 10 cannot simultaneously transmit and receive, the power-feeding period and the reception period are alternately set. That is, the power-feeding device 10 cannot feed power while receiving a beacon and cannot receive a beacon while feeding power. For this reason, the whole power-feeding beam from the adjacent power-feeding device 10-2 is not always detected, and only a part of the power-feeding beam from the power-feeding device 10-2 may be detected, and accurate determination cannot be achieved based on only a part of the power-feeding beam. In this case, if the time length of the beacon is known, reception of the beacon can be determined more accurately.

The time length of the power-feeding beam and the time length of the beacon may be determined based on the specifications of the wireless power-feeding system or the specifications of the wireless communication systems that may coexist. The specifications of the wireless power-feeding system may include required power-feeding efficiency, feeding power, frequency band, power-feeding distance, and the number of power-receiving devices. Once the feeding power, the frequency band, and the power-feeding distance are determined, energy that can be fed to the power-receiving device can be calculated. Therefore, the time length of the power-feeding beam and the power-feeding interval can be determined to satisfy the required power-feeding efficiency. In addition, if the power-feeding device employs a half-duplex communication method, that is, if the specifications specify that reception cannot be performed during power-feeding and power-feeding cannot be performed during reception, power-feeding cannot be performed while receiving a beacon, and thus the time length of the beacon may be determined so as to satisfy the required power-feeding efficiency.

If considering the specifications of coexisting wireless communication systems, for example, considering coexistence with wireless LANs conforming to the IEEE 802.11 standard, the maximum packet length of wireless LANs is about milliseconds, so that the time length of the power-feeding beam ranges from several milliseconds to several tens of milliseconds. The time required for the power-feeding device to use the wireless channel and the time required for the wireless LAN to use the wireless channel can be on the same order. Therefore, fair (in terms of time length, throughput, and period during which the channel utilizes electromagnetic wave) coexistence in view of wireless channel utilization period is achieved. In many cases, the wireless LAN has a carrier sense function, and transmits an electromagnetic wave only if the wireless channel is free (no other signal is present). Similarly, the power-feeding device may also have a carrier sense function and may be configured to feed power only if there is no other signal. In this case, if the time length of the beacon is on the order different from the time length of the power-feeding beam, that is, it is less than 1 millisecond or it is 100 milliseconds or more, the beacon can be easily identified from the power-feeding beam.

As described, according to the first embodiment, the time length of the power-feeding beam and the time length of the beacon are set to be different. The power-feeding device measures the time length of the received electromagnetic wave and compares the measured length with at least one of the known power-feeding time length or the beacon time length. It is possible to identify whether the received electromagnetic wave is a beacon or a power-feeding beam of another power-feeding device. Therefore, even if the power-feeding beam and beacon that use the same frequency band are received by the power-feeding device at the same time or with a very short time difference, the presence or absence of collision between the power-feeding beam and the beacon can be detected, and thus the influence of mutual interference may be reduced. As a result, the beacon can be received more correctly, the wireless channel can be accurately estimated, and a power-feeding beam with an efficient beam pattern can be formed.

The time length of the power-feeding beam may be selected from optional time lengths. The time length of the beacon is set to be different from any of the optional time lengths. If there are selected time lengths for the power-feeding beam, the power feeding can be optimized based on the electromagnetic wave environment of the power-feeding area. If there is another wireless communication system that coexists with the power-feeding system, the time length of the power-feeding beam can be shortened to reduce the impact on other wireless communication systems. If there is no other coexisting wireless communication system, the time length of the power-feeding beam can be lengthened to increase the power-feeding efficiency.

In addition, since the wireless channel characteristic changes depending on the installation location of the power-receiving device, the time length of the power-feeding beam may be changed for each power-receiving device. If the installation environment of the power-feeding device and the power-receiving device are known, the time length of the power-feeding beam may be long. However, if it is unknown, the maximum value of time length of the power-feeding beam may be limited based on the possibility of interference with other systems. If the power-feeding device has a carrier sense function and can check the existence of coexisting wireless channel, the time length of the power-feeding beam may be shortened if the presence of other wireless channel is detected and may be lengthened if it is not detected.

Second Embodiment

In the first embodiment, the power-receiving device manages the transmission timing of the beacon (the reception timing of the beacon in the power-feeding device), and the power-feeding device identifies the beacon and the power-feeding beam based on the time length of the received electromagnetic wave. In a second embodiment, a power-feeding device manages a reception timing of a beacon. Therefore, the power-feeding device transmits a beacon request to the power-receiving device, and the power-receiving device returns a beacon to the power-feeding device within a particular period after the reception of the beacon request. As a result, the power-feeding device can identify the beacon and a power-feeding beam based on the reception timing of the electromagnetic wave.

(Wireless Power-Feeding System)

Figure 7:
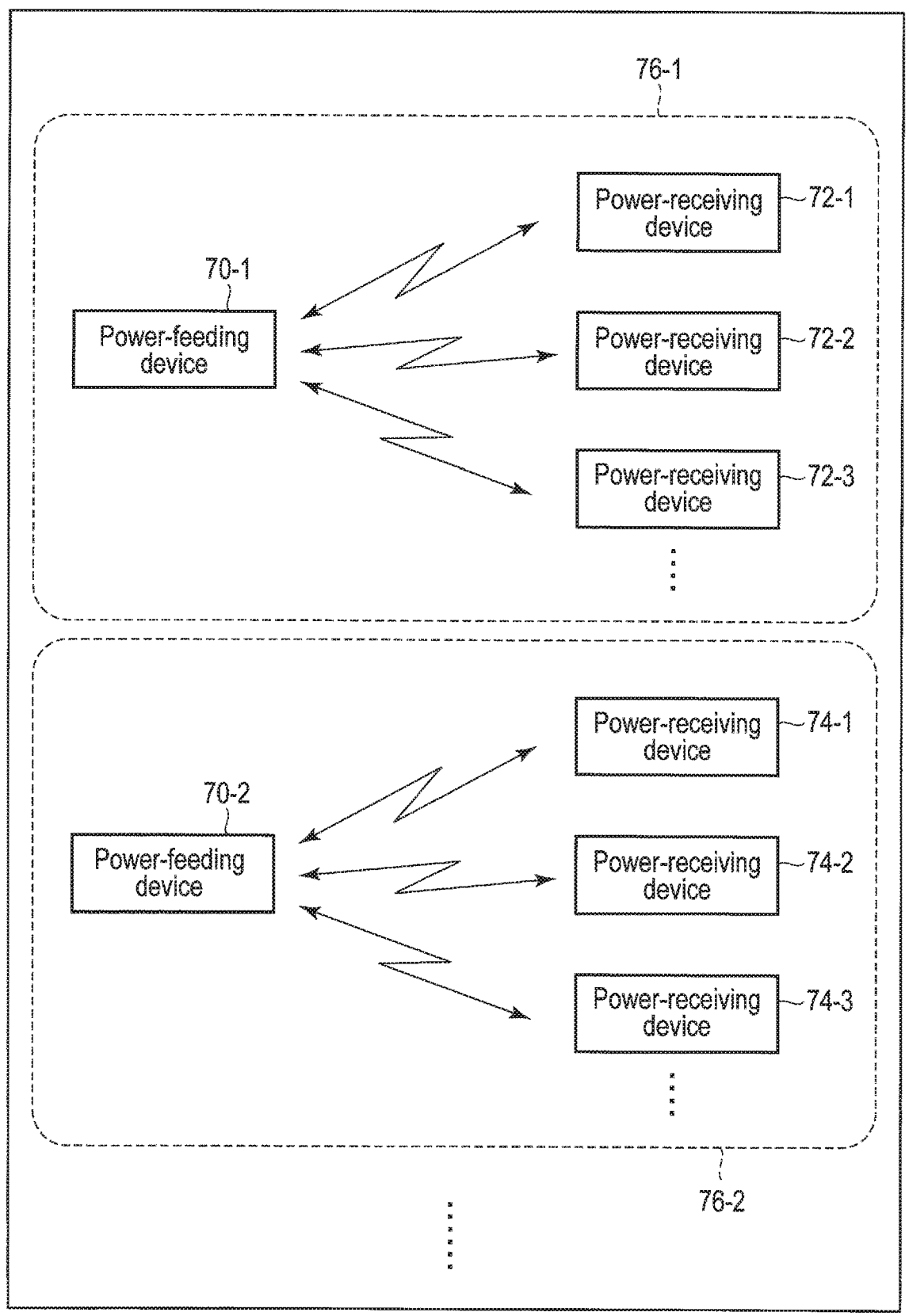
FIG. 7 is a block diagram illustrating an example of a wireless power-feeding system including an electronic apparatus according to a second embodiment.

FIG. 7 is a block diagram illustrating an example of a wireless power-feeding system including a power-feeding device that is an example of an electronic apparatus according to the second embodiment. The wireless power-feeding system includes feeding devices 70-1, 70-2, . . . (collectively referred to as a power-feeding device 70), power-receiving devices 72-1, 72-2, . . . (collectively referred to as power-receiving device 72), and power-receiving devices 74-1, 74-2, . . . (collectively referred to as power-receiving device 74). Each of the power-feeding devices 70-1, 70-2, . . . has power-feeding areas 76-1, 76-2, . . . (collectively referred to as a power-feeding area 76) where power can be fed. The power-feeding device 70-1 transmits power to the power-receiving device 72 located in the power-feeding area 76-1 using a power-feeding beam. The power-feeding device 70-2 transmits power to the power-receiving devices 74 located in the power-feeding area 76-2 using power-feeding beams. Note that only a single power-receiving device may exist in the power-feeding area 76.

The frequency bands of the power-feeding beam and the beacon are the same as in the first embodiment.

In the second embodiment, since the beacon and the power-feeding beam are identified based on the reception timing of the electromagnetic wave, the time lengths of the power-feeding beam and the beacon may be any time lengths. However, if the time lengths of the power-feeding beam and the beacon may be different from each other as in the first embodiment, the beacon and the power-feeding beam can be identified based on the reception timing and the time length. Therefore, the identification accuracy is further improved.

(Power-Feeding Device)

Figure 8:
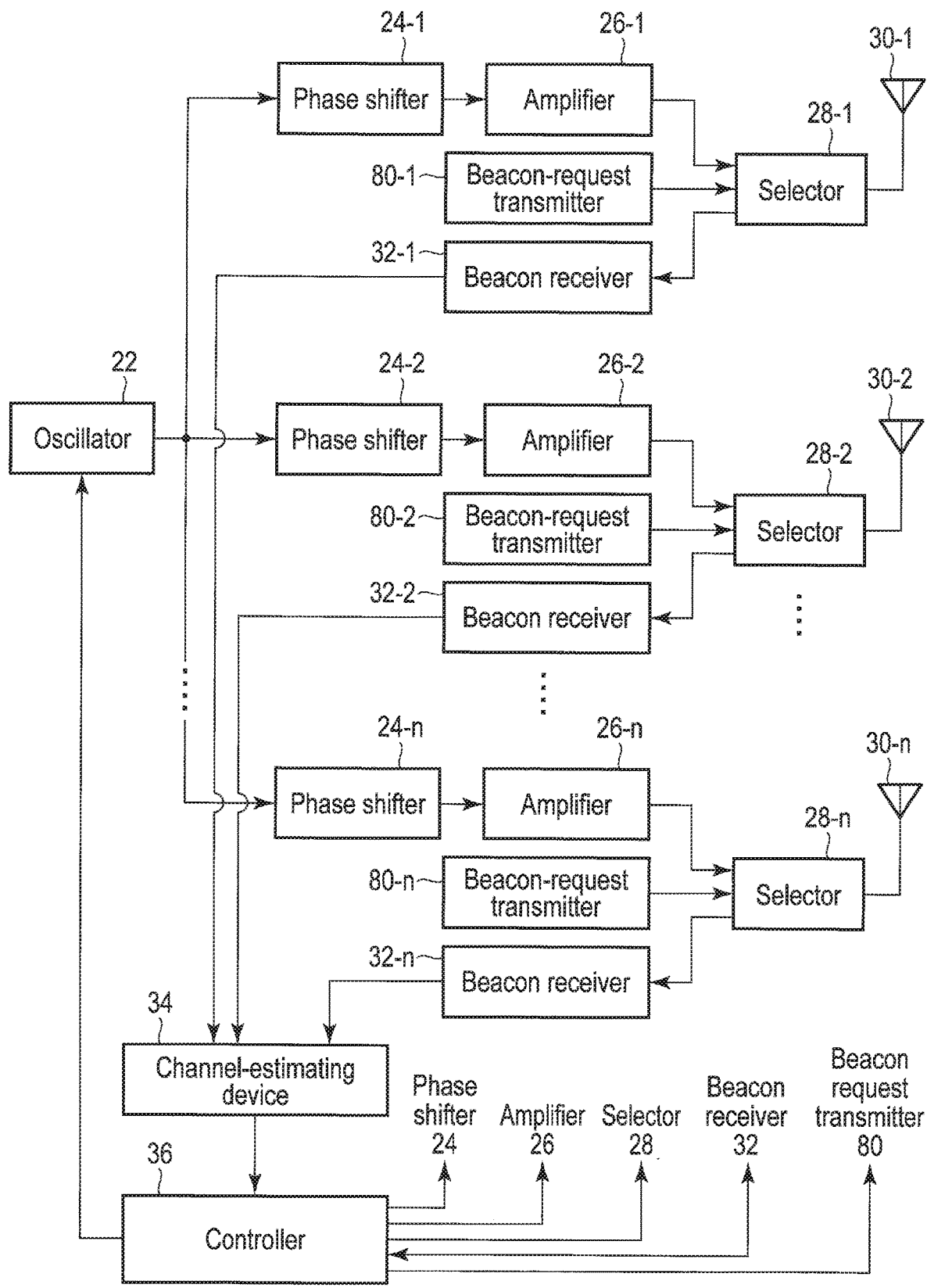
FIG. 8 is a block diagram illustrating an example of the power-feeding device in the wireless power-feeding system according to the second embodiment.

FIG. 8 is a block diagram illustrating an example of the power-feeding device 70. The power-feeding device 70 of the second embodiment is different from the power-feeding device 10 of the first embodiment in that beacon-request transmitters 80-1, 80-2, . . . (collectively referred to as a beacon-request transmitter 80) are provided. The beacon-request transmitter 80 and the controller 36 are connected to each other, and signals are fed to each other. The power-feeding device 70 generates a beacon request in the beacon-request transmitter 80 and radiates the beacon request to the power-receiving device 72 or 74 via the selector 28 and the antenna 30. Instead of irradiating the beacon request via the antenna 30 for power feeding, a beacon request may be irradiated with a dedicated antenna. In this case, there is no need for the beacon-request transmitters 80-1, 80-2, . . . as illustrated in FIG. 8. Only one beacon-request transmitter 80 may be used. Further, a dedicated antenna other than the antenna 30 may receive the beacon.

In the power-feeding device 70, transmission of the power-feeding beam and reception of the beacon use the same frequency band (referred to as a first frequency band). However, transmission of the beacon request uses a second frequency band. By making the frequency band of the beacon request different from the frequency band of the power-feeding beam and the beacon, the beacon request can be prevented from interfering with the power-feeding beam and the beacon.

As a wireless communication method using the second frequency band, a dedicated wireless communication system may be constructed for the power-feeding system, or a general-purpose wireless communication system that is widely used in the market may be used. The power-feeding device 70 may include a signal receiver in the second frequency band instead of the beacon-request transmitter 80 or in addition to the beacon-request transmitter 80. In this case, the power-feeding device 70 can exchange parameters relating to a beacon request via wireless communication of the second frequency band with the power-receiving device 72 or 74. The parameters may include identification information of the power-receiving device (hereinafter referred to as power-receiving device ID), the time length of the beacon, the delay time (at least one of the minimum value or the maximum value) from the reception of the beacon request to a return of the beacon by the power-receiving device, the encoding method of the beacon. Power can be fed more efficiently by estimating the wireless channel based on those parameters.

(Power-Receiving Device)

FIG. 9 is a block diagram illustrating an example of the power-receiving device 72 or 74. The power-receiving device 72 or 74 of the second embodiment is different from the power-receiving device 12 of the first embodiment in that a beacon-request receiver 82 is provided. In FIG. 9, the antenna 48 is common for power reception and beacon request reception, but separate antennas for power reception and beacon request reception may be provided. In FIG. 9, the connection is branched from the selector 46 to the receiver 52 and the beacon-request receiver 82. However, a common signal line may be connected from the selector 46 to the receiver 52 and the beacon-request receiver 82.

If the power-feeding device 70 includes the signal receiver of the second frequency band, the power-receiving device 72 or 74 may exchange parameters relating to the beacon request via the second frequency band with the power-feeding device 70. The parameters may include the power-receiving device ID, the time length of the beacon, the delay time (at least one of the minimum value or the maximum value) from the reception of the beacon request to a return of the beacon by the power-receiving device.

(Operation Example of Power Feeding)

Figure 10:
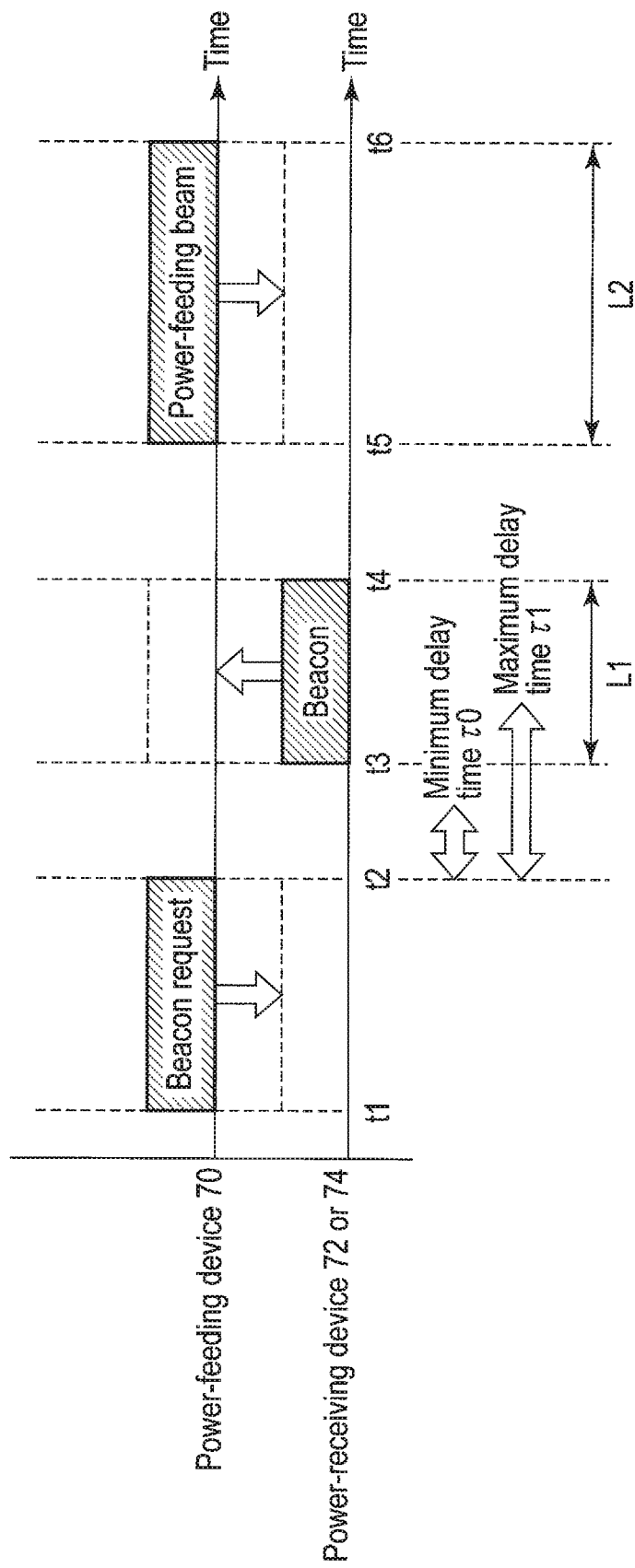
FIG. 10 is a sequence chart illustrating an example of wireless power feeding according to the second embodiment.

An example of the power-feeding operation of the second embodiment will be described with reference to FIG. 10.

The power-feeding device 70 transmits a beacon request in the second frequency band to the power-receiving device 72 or 74 at a time t1. The time t1 may be a time determined periodically by the power-feeding device 70, a time when the power-receiving device 12 of the first embodiment radiates a beacon, or a time determined by the power-feeding device 70 based on some conditions. For example, the power-receiving device 72 or 74 may feedback the power-receiving amount to the power-feeding device 70 via wireless communication in the second frequency band. If a power-receiving device 72 or 74 has a power-receiving amount smaller than other even though the power-feeding amount is the same, the power-feeding device 70 may determine that the wireless channel between the power-receiving device 72 or 74 may have changed, and transmit a beacon request to the power-receiving device 72 or 74. Further, the power-feeding device 70 may include a motion sensor or a temperature sensor, and if any change is detected, the power-feeding device 70 may determine that the wireless channel may have changed, and transmit a beacon request.

The beacon request includes the power-receiving device ID. The power-receiving device ID may be a known ID set in advance to the power-feeding device 70 (for example, the ID is set to the power-feeding device 70 when the power-receiving device 72 or 74 is installed). The power-receiving device ID may be exchanged between the power-feeding device 70 and the power-receiving device 72 or 74 via the wireless communication in the second frequency band prior to the transmission of the beacon request.

The power-receiving device 72 or 74 receives a beacon request in the second frequency band by the beacon-request receiver 82. If the power-receiving device ID included in the received beacon request matches its own ID, the power-receiving device 72 or 74 starts transmitting a beacon in the first frequency band at a time t3. A predetermined delay time is between a reception completion time t2 of the beacon request and the time t3.

The predetermined delay time is not shorter than a minimum delay time τ0 and is not longer than a maximum delay time τ1. That is, the power-receiving device 72 or 74 starts transmitting a beacon before a delay time of τ0 or more and τ1 or less elapses from the reception completion time t2 of the beacon request. The minimum delay time τ0 and the maximum delay time τ1 may be determined by the power-feeding device 70 and the power-receiving device 72 or 74 or may be notified from the power-feeding device 70 to the power-receiving device 72 or 74 by a beacon request.

The delay time may not be defined by the range between the minimum value and the maximum value and may be defined by either one. If only the minimum delay time τ0 is specified, the power-receiving device 72 or 74 starts transmitting the beacon after τ0 or more has elapsed from the reception completion time t2 of the beacon request. If only the maximum delay time τ1 is specified, the power-receiving device 72 or 74 starts transmitting the beacon before τ1 or less has elapsed from the reception completion time t2 of the beacon request. However, by setting both the minimum delay time τ0 and the maximum delay time τ1, the risk of misjudgment between the beacon and the power-feeding beam may further be reduced.

If the power-receiving device ID included in the received beacon request does not match its own ID, the power-receiving device 72 or 74 does not transmit a beacon. As a result, since the beacon is transmitted only from the power-receiving device 72 or 74 intended by the power-feeding device 70 as the power-feeding target, the power-receiving device 72 or 74 which does not conform to the target of the power-feeding device 70 is not irradiated with the power-feeding beam.

The power-feeding device 70 starts receiving an electromagnetic wave at the time t3. If the reception start time t3 of the electromagnetic wave is after the minimum delay time τ0 and before the maximum delay time τ1 from the transmission end time t2 of the beacon request, the power-feeding device 70 determines the received electromagnetic wave as a beacon. The power-feeding device 70 determines that the electromagnetic wave received before the minimum delay time τ0 from the transmission end time t2 of the beacon request or the electromagnetic wave received after the maximum delay time τ1 from the time t2 is a signal other than the beacon.

By limiting the reception timing of the beacon by such a process, the power-feeding device 70 can recognize more correctly whether the received signal is a beacon from the specified power-receiving device 72 or 74 or a power-feeding beam from other power-feeding devices 70, so that the risk of erroneous estimation of channel characteristics is reduced.

On the power-feeding device 70 side, a time length L1 of the beacon may be unknown or may be known. If the time length L1 of the beacon is known, the power-feeding device 70 determines that an electromagnetic wave other than that with the time length L1 is not the beacon, even if the reception start time t3 of the electromagnetic wave is after the minimum delay time τ0 and before the maximum delay time τ1 from the transmission end time t2 of the beacon request. The power-feeding device 70 determines that an electromagnetic wave with the time length L1 is the beacon if the reception start time t3 of the electromagnetic wave is after the minimum delay time τ0 and before the maximum delay time τ1 from the transmission end time t2 of the beacon request. As a result, the detection accuracy of a beacon improves.

The time length L1 of the beacon may be preset in the power-feeding device 70 and the power-receiving device 72 or 74. The power-feeding device 70 may notify the power-receiving device 72 or 74 of the time length L1 by a beacon request.

Furthermore, as a condition for determining that the power-feeding device 70 has received a beacon, a time length L2 of the power-feeding beam may be used instead of the time length L1 of the beacon as in the first embodiment. The power-feeding device 70 may determine that an electromagnetic wave with the time length L2 is the power-feeding beam even if the reception start time t3 of the electromagnetic wave is after the minimum delay time $\tau 0$ and before the maximum delay time $\tau 1$ from the transmission end time t2 of the beacon request. The power-feeding device 70 may determine that an electromagnetic wave other than that with the time length L2 is a beacon if the reception start time t3 of the electromagnetic wave is after the minimum delay time $\tau 0$ and before the maximum delay time $\tau 1$ from the transmission end time t2 of the beacon request.

Further, as in the first embodiment, as conditions for determining that the power-feeding device 70 has received the beacon, the reception timing of the electromagnetic wave, the time length L1 of the beacon, and the time length L2 of the power-feeding beam may also be used.

If the electromagnetic wave that satisfies the conditions such as the reception start timing and the time length as described above cannot be received after the power-feeding device 70 has completed transmitting the beacon request, the power-feeding device 70 may retransmit the beacon request. At that time, the retransmission timing of the beacon request may be adjusted, or information such as delay time and time length notified by the beacon request may be adjusted.

If the power-feeding device 70 has a function of monitoring the presence or absence of a power-feeding beam from the adjacent power-feeding device 70, the power-feeding device 70 may transmit a beacon request only if it is determined that there is no power-feeding beam. Thus, the retransmission timing of the beacon request is adjusted. If the beacon and the power-feeding beam are in the same frequency band, the presence or absence of the power-feeding beam cannot be accurately identified. Therefore, if it is determined that a signal is present, the beacon request may not be sent, because there may be a power-feeding beam.

If the beacon cannot be received, it is unlikely that the beacon can be correctly received with the delay time and time length set so far. However, the probability of receiving the beacon correctly may be increased by changing at least one of the delay time and time length.

Figure 11:
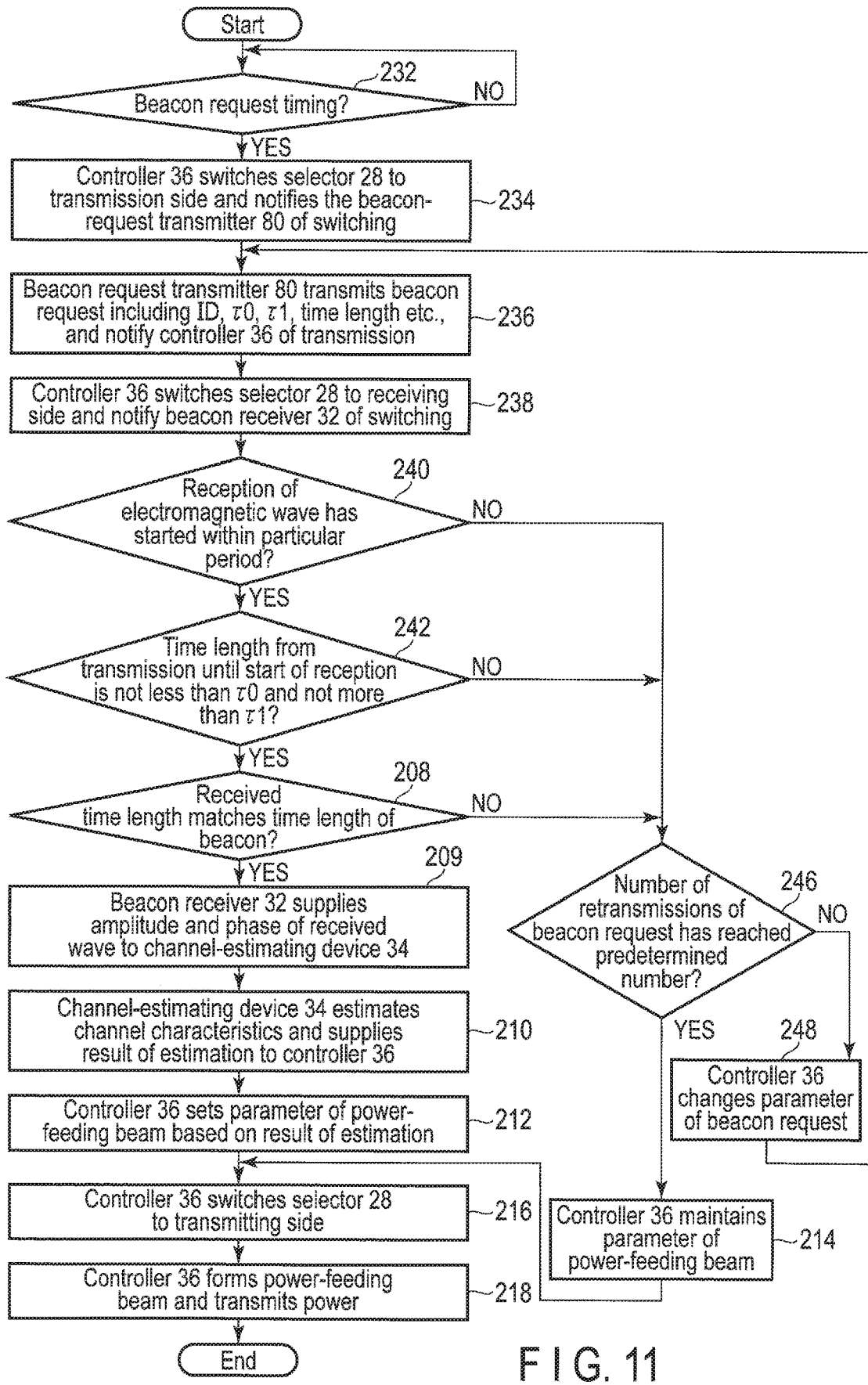
FIG. 11 is a flowchart illustrating an operation example of the power-feeding device in the wireless power-feeding system according to the second embodiment.

FIG. 11 is a flowchart illustrating an example of a processing flow of the power-feeding device 70. In step 232, the controller 36 of the power-feeding device 70 determines whether it is beacon request timing for transmitting a beacon request (the time t1 in FIG. 10). The determination in step 232 is repeated until the beacon request timing is reached.

If the beacon request timing is reached, the controller 36 switches the selector 28 to the transmission side and notifies the beacon-request transmitter 80 of the switching in step 234.

In step 236, the beacon-request transmitter 80 transmits a beacon request including information on the beacon request via the selector 28 and the antenna 30 and notifies the controller 36 of the transmission of the beacon. The information may include power-receiving device ID, time length of the beacon, minimum delay time $\tau 0$, and maximum delay time $\tau 1$. The delay time (at least one of the minimum value $\tau 0$ and the maximum value $\tau 1$) from the reception of the beacon request to the return of the beacon is determined in advance. Note that if there is only a single power-receiving device in the power-feeding area 14, the power-receiving device ID may not be included.

If the transmission of the beacon is notified, the controller 36 switches the selector 28 to the receiving side and notifies a beacon receiver 32 of the switching in step 238. Subsequently, since the beacon receiver 32 can receive an electromagnetic wave that is a continuous wave, if the beacon is transmitted from the power-receiving device 72 or 74, the beacon receiver 32 receives the beacon. At the same time, the beacon receiver 32 also receives a power-feeding beam that is a continuous wave from the adjacent power-feeding device 70 or the reflected wave thereof, if any.

In step 240, the beacon receiver 32 determines whether reception of a continuous wave has started within a particular period from the completion of transmission of the beacon request.

If reception of a continuous wave has started within the particular period from the completion of transmission of the beacon request (if the determination result in step 240 is YES), the beacon receiver 32 determines whether or not the time length from the completion of the transmission of the beacon request until the start of reception of the continuous wave is within a specified delay time (minimum delay time $\tau 0$ or more and maximum delay time $\tau 1$ or less) in step 242.

If the time length from the completion of transmission of the beacon request to the start of reception of the continuous wave is the specified delay time (if the determination result of step 242 is YES), the beacon receiver 32 determines whether or not the time length of the received electromagnetic wave matches the time length L1 of the beacon in step 208 as in the first embodiment. If the time length of the received electromagnetic wave matches the time length L1 of the beacon (if the determination result of step 208 is YES), the same processing as in the first embodiment (step 209, step 210, step 212, step 216, and step 218) is executed.

If the determination result in step 208 is NO (if the time length of the received electromagnetic wave does not match the time length L1 of the power-feeding beam), if the determination result in step 242 is NO (if the time from the completion of transmission of the beacon request to the start of the reception of the continuous wave is not the specified delay time), or if the determination result of step 240 is NO (if reception of a continuous wave has not started within a particular period from the completion of transmission of the beacon request), the controller 36 determines whether or not the number of retransmissions of the beacon request has reached a predetermined number in step 246.

If the number of beacon request retransmissions has not reached the predetermined number (if the determination result in step 246 is NO), the controller 36 causes the beacon-request transmitter 80 to change parameters relating to the beacon request (for example, at least one of the delay time and the time length) in step 248. Subsequently, step 236 is executed, and the beacon request with the changed parameter is retransmitted.

If retransmitting a beacon request, the beacon may not have been received correctly due to the delay time, the time length, etc., that have been set up to that point. Therefore, the probability that a beacon can be received may be increased by changing at least one of the delay time and time length.

If the number of retransmissions of the beacon request has reached the predetermined number (if the determination result in step 246 is YES), the controller 36 maintains parameters (phase and amplitude) that determine the beam pattern of the power-feeding beam in step 214.

Similarly to the first embodiment, step 206 illustrated in FIG. 4 is executed before step 208 in FIG. 11, and the time length of the received electromagnetic wave may be compared with the time length of the power-feeding beam.

Although the beacon and the power-feeding beam are identified based on both the time length and the reception timing in the flowchart of FIG. 11, the identification may be performed based only on the reception timing, not based on the time length.

Figure 12:
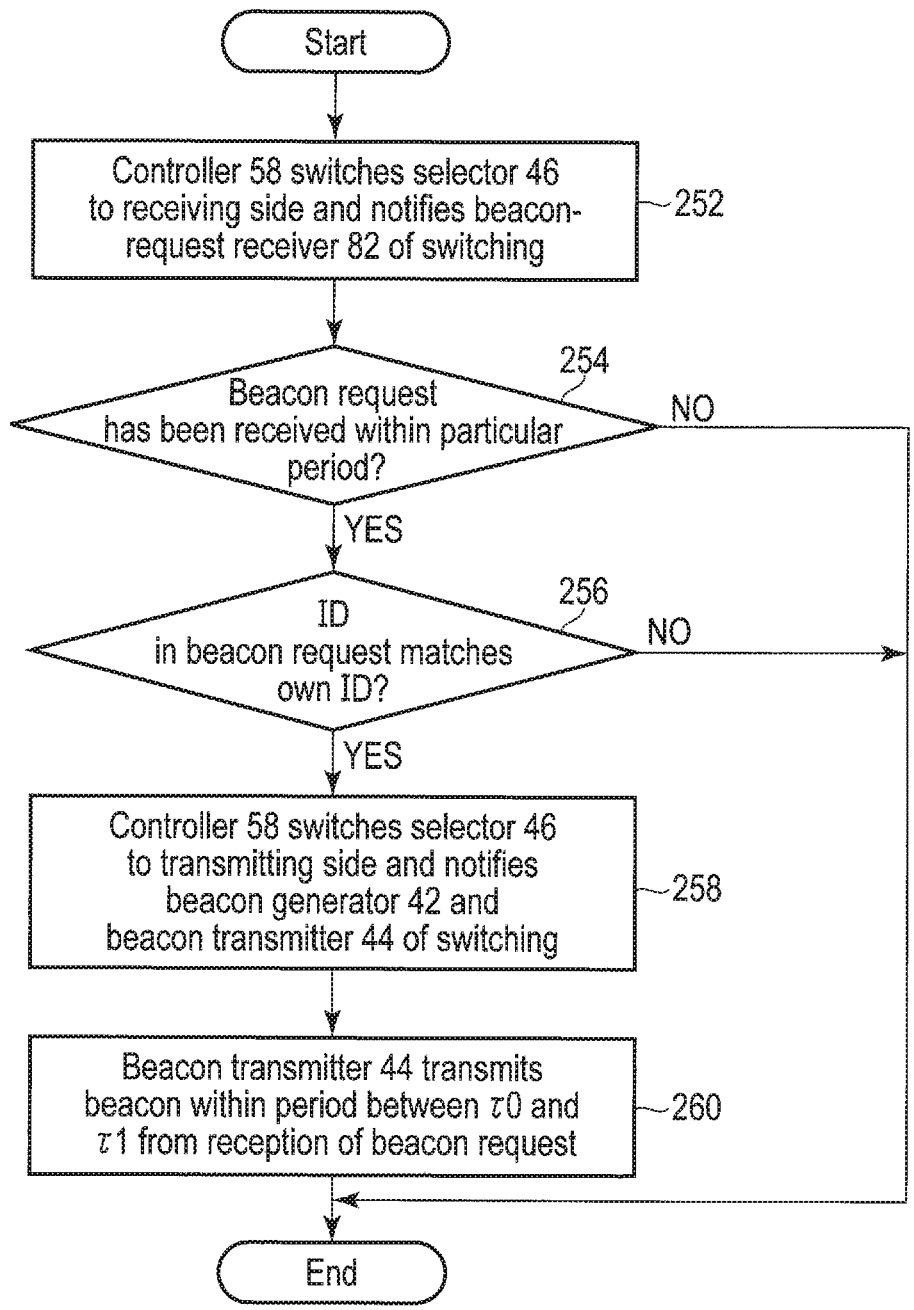
FIG. 12 is a flowchart illustrating an operation example of the power-receiving device in the wireless power-feeding system according to the second embodiment.

FIG. 12 is a flowchart illustrating an example of the processing flow of the power-receiving device 72 or 74. In step 252, the controller 58 switches the selector 46 to the receiving side and notifies the beacon-request receiver 82 of the switching. In step 254, the beacon-request receiver 82 determines whether a beacon request has been received within a particular period from the switching of the receiver 82. If the beacon request has not been received within the particular period (the determination result in step 254 is NO), the process ends.

If the beacon request has been received within the particular period (if the determination result of step 254 is YES), the beacon-request receiver 82 determines whether the power-receiving device ID included in the beacon request matches its own ID in step 256. The determination result is fed to the controller 58.

If the power-receiving device ID included in the beacon request matches its own ID (the determination result in step 256 is YES), the controller 58 switches the selector 46 to the transmission side and notifies the beacon generator 42 and a beacon transmitter 44 of the switching in step 258. In step 260, the beacon transmitter 44 starts transmitting a beacon before a predetermined delay time (τ0 or more and τ1 or less) elapses from the completion of reception of the beacon request. That is, the beacon transmitter 44 starts transmitting a beacon within a period between a minimum delay time τ0 and a maximum delay time τ1 from the completion of reception of the beacon request.

If the power-receiving device ID included in the beacon request does not match its own ID (if the determination result of step 256 is NO), the process ends, and the beacon is not transmitted. Note that the process of FIG. 12 may be performed repeatedly. Further, as described above, the power-receiving device 72 or 74 may include an independent antenna configured to receive the beacon request. In that case, the beacon-request receiver 82 can perform the reception process independently of the switching operation of the selector 46.

As described above, according to the second embodiment, the power-feeding device 70 transmits a beacon request to the power-receiving device 72 or 74. The power-receiving device 72 or 74 return the beacon within the predetermined delay time after the reception of the beacon request. As a result, the power-feeding device 70 can predict the timing when the beacon arrives, reduce the risk that the beacon collides with the power-feeding beam from other power-feeding devices, and correctly identify the beacon and the power-feeding beam based on the reception timing. This enables accurate estimation of the wireless channel and formation of a power-feeding beam with an efficient beam pattern.

Third Embodiment

In the first embodiment, the beacon and the power-feeding beam are identified based on the time length. In the second embodiment, the beacon and the power-feeding beam are identified further based on the reception timing. In a third embodiment, a beacon and a power-feeding beam are identified depending on whether a reception signal is an unmodulated signal or a modulated signal. In the first and second embodiments, the continuous wave (unmodulated wave signal) is used for the beacon as in the case of the power-feeding beam. However, in the third embodiment, a modulated wave signal is used as a beacon. For this reason, it is easy to identify a power-feeding beam that is an unmodulated signal from another power-feeding device and a beacon that is a modulated signal. Further, in the third embodiment, wireless communication in the second frequency band is performed between the power-feeding device and the power-receiving device. A signal exchanged by wireless communication in the second frequency band may include a beacon request.

The block diagram of the entire power-feeding system is the same as the block diagram of the second embodiment illustrated in FIG. 7.

(Power-Feeding Device)

FIG. 13 illustrates a block diagram of a power-feeding device of the third embodiment. In the power-feeding device of the third embodiment, a data-communicating device 90 and an antenna 92 are added to the power-feeding device of the second embodiment illustrated in FIG. 8. The data-communicating device 90 performs wireless communication in the second frequency band. In addition to the function of a beacon receiver 32, a beacon receiver 32a has a function of receiving a modulated beacon and demodulating the modulated beacon.

(Power-Receiving Device)

FIG. 14 illustrates a block diagram of a power-receiving device of the third embodiment. In the power-feeding device of the third embodiment, a modulator 94, a data communicating device 96, and an antenna 98 are added to the power-receiving device of the second embodiment illustrated in FIG. 9. The modulator 94 is connected between the beacon generator 42 and the beacon transmitter 44, modulates the beacon output from the beacon generator 42, and feeds a modulated beacon to the beacon transmitter 44. The data-communicating device 96 performs wireless communication in the second frequency band with the data-communicating device 90 of the power-feeding device and exchanges various data with the power-feeding device.

The modulation method of the beacon may be a known method ruled in advance by the power-feeding device and the power-receiving device or may be notified to the power-receiving device by the beacon request transmitted from the power-feeding device. The beacon is modulated in order to distinguish it from the power-feeding beam of the unmodulated signal, thus it is not necessary to use a complicated modulation method. As an example of the modulation method, a simple modulation method such as On-Off-Keying (OOK) or Binary-Phase-Shift-Keying (BPSK) can be employed. For this reason, the hardware of the modulator 94 and the beacon receiver 32a can be simplified, and the load on the power-feeding device 70 and the power-receiving device 72 or 74 is decreased. Furthermore, the beacon may be encoded.

(Operation Example of Power Feeding)

Figure 15:
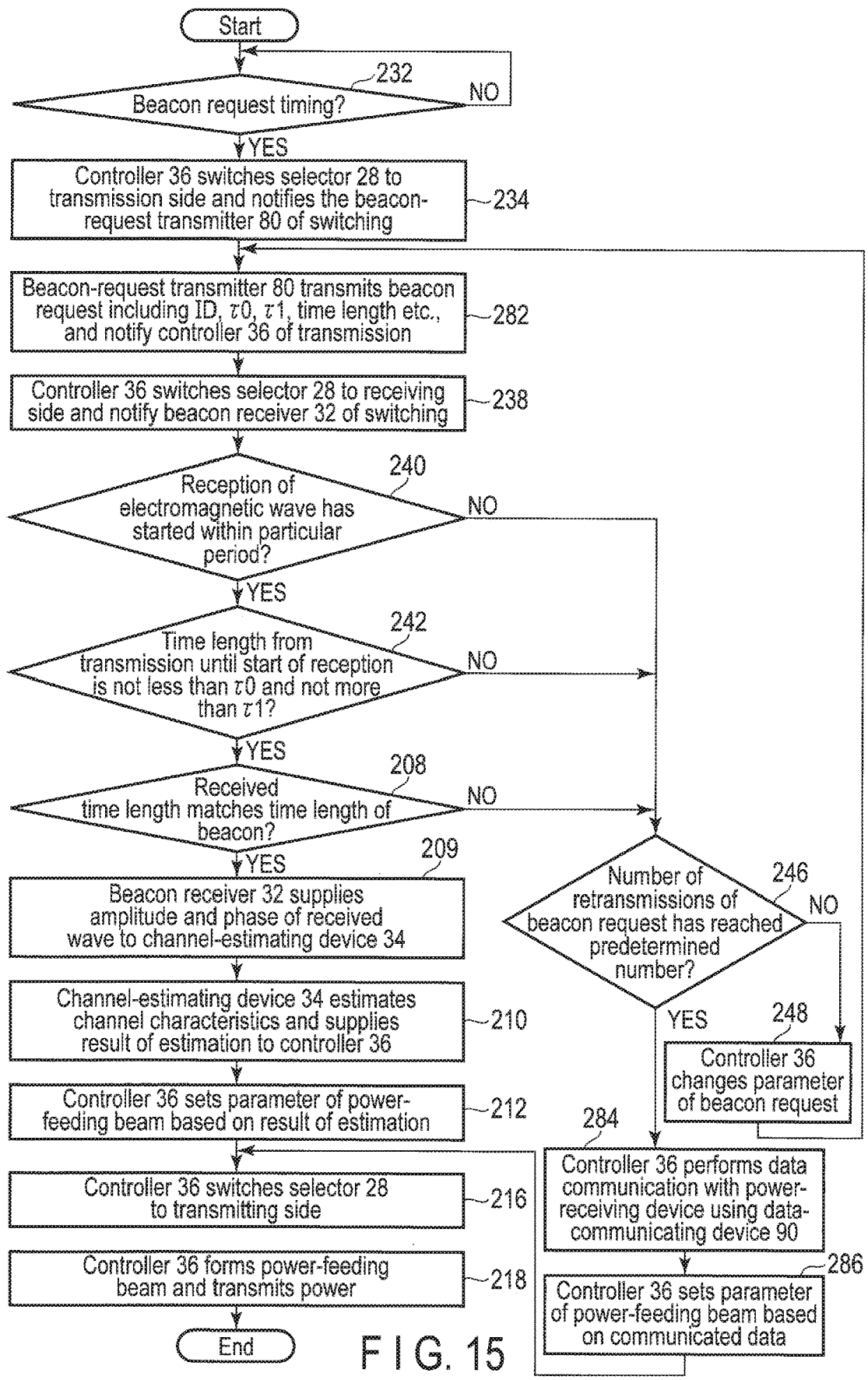
FIG. 15 is a flowchart illustrating an operation example of the power-feeding device in the wireless power-feeding system according to the third embodiment.

FIG. 15 is a flowchart illustrating an example of a processing flow of the power-feeding device according to the third embodiment. Similarly to the second embodiment, if the beacon request timing comes in step 232, the selector 28 is switched to the transmission side in step 234, and the beacon request is transmitted. Unlike step 236 of the second embodiment, in step 282, the beacon-request transmitter 80 transmits a beacon request including information on the beacon request via the selector 28 and the antenna 30 and notifies the controller 36 of transmission of the beacon request. The information on the beacon request may include power-receiving device ID, time length of the beacon, minimum delay time τ0, maximum delay time τ1, modulation method, modulation data, identification data, and encoding method. If there is only a single power-receiving device in the power-feeding area 14, the power-receiving device ID may not be included.

Subsequently, processes similar to those in the second embodiment (step 238, step 240, step 242, step 208, step 209, step 210, step 212, step 216, and step 218) are executed.

If the beacon cannot be received, the controller 36 determines whether or not the number of retransmissions of the beacon request has reached a predetermined number in step 246 as in the second embodiment.

If the number of retransmissions of the beacon request has not reached the predetermined number (if the determination result of step 246 is NO), the parameters of the beacon request are changed in step 248 as in the second embodiment, and step 282 is executed. For example, at the time of retransmission of the beacon request, at least one of the power-receiving device ID, the modulation method, the code, or the delay time is changed. In an environment difficult to receive the beacon from the power-receiving device 72 or 74 of a certain ID, if the power-receiving device ID is changed, the power-feeding target can be switched to the power-receiving device 72 or 74 of another ID. If the modulation method or code is changed to a modulation method or a code that is more resistant to noise and interference, it becomes easy to receive a beacon. By adjusting the transmission timing of the beacon request and transmission data in this manner, an improvement of the probability of correctly receiving the beacon is enabled.

If retransmitting the beacon request, the transmission timing of the beacon request may be adjusted, or the transmission data may be adjusted as in the second embodiment.

If the number of retransmissions of the beacon request has reached the predetermined number (if the determination result in step 246 is YES), the controller 36 performs step 284 to exchange data relating to beacon generation instead of step 214 in the second embodiment. In step 214, the controller 36 performs wireless data communication in the second frequency band to exchange data relating to beacon generation with the data communicating device 96 of the power-receiving device by using the data communicating device 90. In step 286, the controller 36 sets parameters (at least one of phase and amplitude) that determine the beam pattern of the power-feeding beam based on the communicated data.

In step 284, the position information of the power-receiving device may be notified to the power-feeding device. The position information may be absolute coordinate information of the power-receiving device, relative coordinate information of the power-receiving device with respect to the power-feeding device, or angle (orientation) information. The power-feeding device forms a power-feeding beam so that the beam is directed to the position or orientation based on the received position information. Instead of directly transmitting position information from the power-receiving device to the power-feeding device, the power-receiving device may transmit an electromagnetic wave of the first frequency band or the second frequency band, and the power-feeding device may estimate the position or the orientation of the power-receiving device based on the received information. As described above, by forming the power-feeding beam toward the position/orientation estimated by the power-feeding device, efficient power feeding toward the power-receiving device can be performed even if a beacon cannot be received.

After step 286, selector 28 is switched to the transmitting side in step 216, a power-feeding beam is formed in step 218, and power is transmitted.

Note that the beacon and the power-feeding beam are identified based on the difference in time length, reception timing and modulation/non-modulation according to the flowchart in FIG. 15. However, identification may be performed only based on the difference between modulated/unmodulated without being based on the time length and the reception timing.

Figure 16:
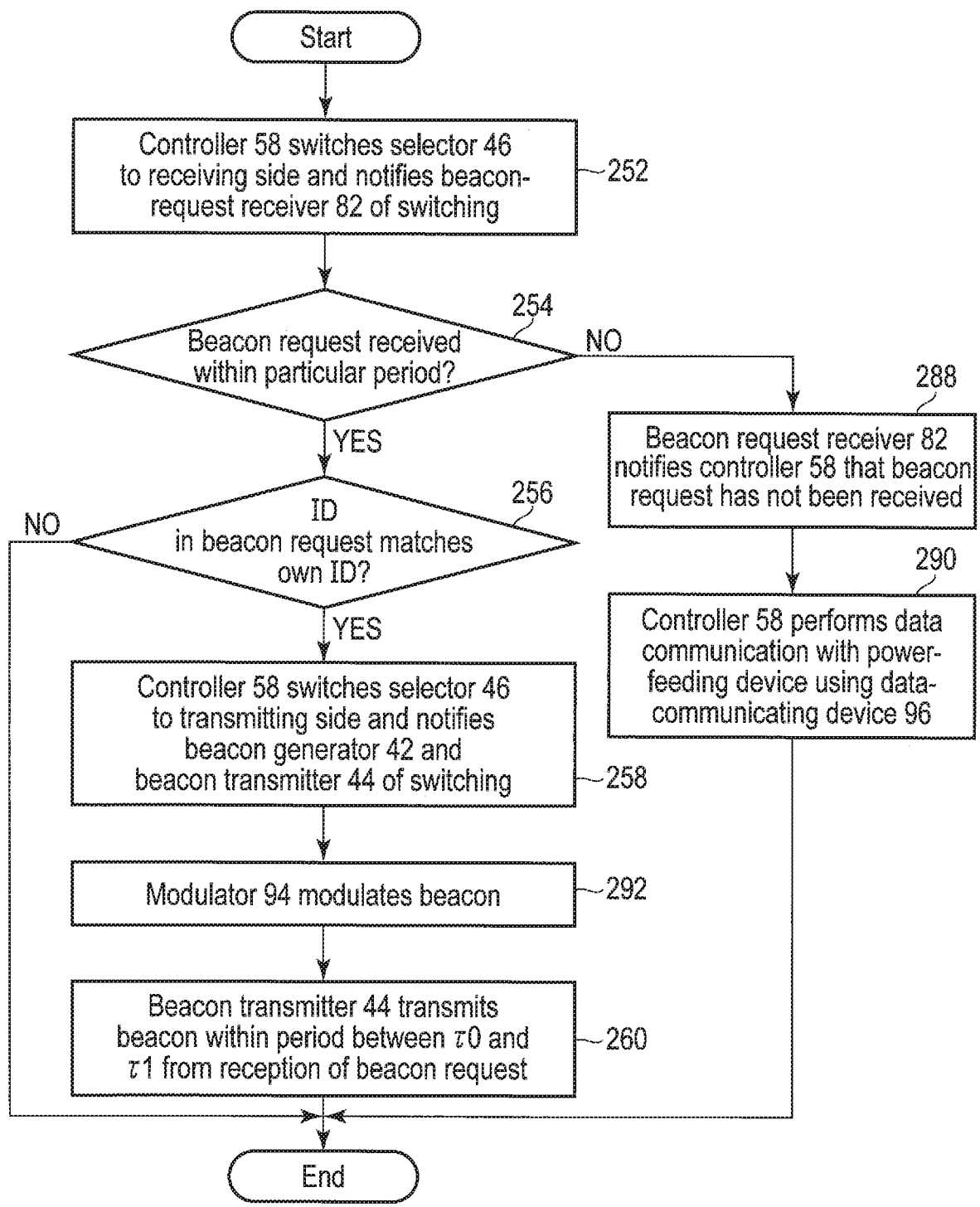
FIG. 16 is a flowchart illustrating an operation example of the power-receiving device in the wireless power-feeding system according to the third embodiment.

FIG. 16 is a flowchart illustrating an example of a processing flow of the power-receiving device 72 or 74. One of the differences from the second embodiment shown in FIG. 12 is that if a beacon request has not received within the particular period (if determination in step 254 is NO), the process does not end, but the beacon-request receiver 82 notifies the controller 58 that the beacon request has not been received in step 288. Then, the controller 58 that has received the notification performs wireless data communication with the data communicating device 90 of the power-feeding device in the second frequency band using the data communicating device 96 in step 290 and performs data communication relating to the beacon request.

Another difference between the processing of the power-receiving device of the third embodiment and the processing of the power-receiving device of the second embodiment is that in step 292 before the beacon is transmitted (step 260 in FIG. 12), the modulator 94 modulates the beacon based on an instruction from the controller 58.

The modulator 94 may modulate the beacon using a modulation method specified in advance, but the power-feeding device may specify the modulation method. If the power-feeding device specifies the modulation method, the power-feeding device adds the modulation method and the modulation data in the beacon request.

The identification data included in the beacon request is information for identifying which power-receiving device transmits the beacon. The modulator 94 modulates the beacon using the identification data. The power-feeding device that receives the beacon including the identification data information can recognize which power-receiving device transmits the beacon, based on the beacon demodulated by the beacon receiver 32*a*. Therefore, the power-feeding device is not required to transmit the power-feeding beam immediately after the reception of the beacon, and can transmit the power-feeding beams after receiving the beacons. Thus, the power-feeding device can delay the feeding timing.

In the third embodiment, a beacon may be encoded. The coding method may include an error correction coding method or a spread spectrum method. If the error correction coding method is employed, the beacon becomes resistant to errors. In the spread spectrum method, for example, the data bit length of the beacon is increased as 010 to 010010, and the beacon is more resistant to noise. The power-feeding device adds information on such an encoding method in a beacon request and notifies the power-receiving device of the same. The beacon transmitter 44 of the power-receiving device modulates the beacon, encodes the modulated beacon and transmits the encoded modulated beacon. The power-feeding device decodes the received encoded modulated beacon and demodulates the received modulated beacon. The encoding in the beacon transmitter 44 of the power-receiving device may be performed before the modulation of the beacon. By transmitting and receiving the encoded beacon in this manner, improvement in error resistance, noise resistance, and interference resistance can be expected, and the power-feeding device can detect the beacon more accurately.

Furthermore, as in the second embodiment, the beacon request may include delay time information. The power-receiving device returns a modulated beacon to the power-feeding device so as to meet the notified delay time condition.

If reception of the beacon continues to fail even after adjusting the transmission timing and transmission data of the beacon request, data communication by wireless communication in the second frequency band is performed to determine the beam pattern of the power-feeding beam as described in steps 284 and 286. However, the power feeding may be stopped until the wireless communication environment is improved, the beam pattern of the power-feeding beam may be maintained as in the first and second embodiments, or any of beam patterns set in advance may be used.

Further, data communication by wireless communication in the second frequency band for determining the beam pattern of the power-feeding beam according to the third embodiment as described in steps 284 and 286 in FIG. 15 may be combined with the first and the second embodiments.

The purpose of the beacon is to estimate the wireless channel, and even if it is modulated as in the second embodiment, the amount of data carried by the beacon is small and only an amount such as the power-receiving device ID can be carried. However, wireless communication in the second frequency band can carry a large amount of data such as battery status and power-feeding amount. If the beacon is transmitted and the power-receiving device ID is included in the beacon, it is possible to know which power-receiving device transmits this beacon.

If a beacon cannot be received, the beam pattern of the power-feeding beam may be determined as follows. The power-feeding device tries to feed power with the predetermined beam patterns. The power-receiving device feeds back the amount of power received at the time of power feeding with each beam pattern to the power-feeding device 70 via the wireless communication in the second frequency band. The power-feeding device 70 may determine the most efficient power-feeding pattern based on the fed back information.

As described, according to the third embodiment, the power-receiving device receives the beacon request including the information on return of the beacon, modulates a beacon based on the power-receiving device ID included in the beacon request, and returns the modulated beacon. The power-feeding device receives the modulated beacon and demodulates the received modulated beacon. Therefore, the power-feeding device can correctly receive the beacon that is a modulated signal and supply the energy to the power-receiving device with an efficient power-feeding beam even in an environment having interference of the power-feeding beam that is unmodulated signal from another power-feeding device.

As an application example of the embodiment, an example of feeding power to various sensors operated with a battery attached to a manufacturing line of a manufacturing factory has been described. However, the application example is not limited thereto, and any device that feeds power over the wireless channel is applicable. For example, a charger that charges a battery of a portable electrical device via a wireless channel instead of an electrical contact may be applicable.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus for feeding power to an electronic device by an electromagnetic wave in a first frequency band, comprising:
   a receiver which receives a beacon from the electronic device via at least a part of the first frequency band, the beacon including an unmodulated signal at least partly; and
   a transmitter which transmits a first electromagnetic wave with a beam pattern for feeding power to the electronic device via the first frequency band, the beam pattern being formed based on the beacon,
   wherein a time length of the beacon is different from a time length of the first electromagnetic wave.

2. The electronic apparatus of claim 1, wherein:
   the time length of the first electromagnetic wave is selected from optional time lengths for the first electromagnetic wave, and
   the time length of the beacon is different from any of the optional time lengths.

3. The electronic apparatus of claim 1, wherein:
   the transmitter transmits a beacon request to the electronic device via a second frequency band.

4. An electronic apparatus for feeding power to an electronic device by an electromagnetic wave in a first frequency band, comprising:
   a transmitter which transmits a first electromagnetic wave for feeding power to the electronic device via the first frequency band and transmits a beacon request to the electronic device via a second frequency band; and
   a receiver which receives a beacon from the electronic device via at least a unit of the first frequency band, the beacon including an unmodulated signal at least partly, the beacon being received after a first time length from a transmission of the beacon request to the electronic device,
   wherein the transmitter transmits the first electromagnetic wave with a beam pattern formed based on the beacon.

5. An electronic apparatus for feeding power to an electronic device by an electromagnetic wave in a first frequency band, comprising:
   a transmitter which transmits a first electromagnetic wave for feeding power to the electronic device via the first frequency band and transmits a beacon request to the electronic device via a second frequency band; and
   a receiver which receives a beacon from the electronic device via at least a part of the first frequency band, the beacon including an unmodulated signal at least partly,
   wherein the transmitter transmits the first electromagnetic wave with a beam pattern formed based on the beacon, and
   wherein the beacon request includes at least one of identification information of the electronic device, a modulation method of the beacon, modulation data of the beacon, an encoding method of the beacon, and a return delay time of the beacon.

6. The electronic apparatus of claim 5, wherein:
the beacon is modulated according to a modulation method of either On-Off-Keying (OOK) or Binary-Phase-Shift-Keying (BPSK).

7. An electronic apparatus for feeding power to an electronic device by an electromagnetic wave in a first frequency band, comprising:
a transmitter which transmits a first electromagnetic wave for feeding power to the electronic device via the first frequency band; and
a signal receiver which receives a transmission signal from the electronic device via a second frequency band, the transmission signal including a modulated signal at least partly,
wherein the transmitter transmits the first electromagnetic wave with a beam pattern formed based on the transmission signal.

8. The electronic apparatus of claim 7, further comprising:
a beacon receiver which receives a beacon from the electronic device via at least a part of the first frequency band, the beacon including an unmodulated signal at least partly,
wherein the transmitter:
transmits the first electromagnetic wave with a beam pattern formed based on the beacon, and
transmits the first electromagnetic wave with a beam pattern formed based on the transmission signal when the beacon receiver fails to receive the beacon by several times.

9. A method of feeding power to an electronic device by an electromagnetic wave in a first frequency band, the method comprising:
receiving a beacon from the electronic device via at least a part of the first frequency band, the beacon including an unmodulated signal at least partly; and
transmitting a first electromagnetic wave with a beam pattern for feeding power to the electronic device via the first frequency band, the beam pattern being formed based on the beacon,
wherein a time length of the beacon is different from a time length of the first electromagnetic wave.

10. The method of claim 9, wherein:
the time length of the first electromagnetic wave is selected from optional time lengths for the first electromagnetic wave, and
the time length of the beacon is different from any of the optional time lengths.

11. The method of claim 9, further comprising:
transmitting a beacon request via a second frequency band.

12. A method of feeding power to an electronic device by an electromagnetic wave in a first frequency band, the method comprising:
transmitting a first electromagnetic wave with a beam pattern for feeding power to the electronic device via the first frequency band and transmitting a beacon request to the electronic device via a second frequency band; and
receiving a beacon from the electronic device via at least a part of the first frequency band, the beacon including an unmodulated signal at least partly, the beacon being received after a first time length from a transmission of the beacon request to the electronic device,
wherein the beam pattern of the first electromagnetic wave is based on the beacon.

13. A method of feeding power to an electronic device by an electromagnetic wave in a first frequency band, the method comprising:
transmitting a first electromagnetic wave for feeding power to the electronic device via the first frequency band and transmitting a beacon request to the electronic device via a second frequency band; and
receiving a beacon from the electronic device via at least a part of the first frequency band, the beacon including an unmodulated signal at least partly,
wherein the first electromagnetic wave is transmitted based on the beacon, and
wherein the beacon request includes at least one of identification information of the electronic device, a modulation method of the beacon, modulation data of the beacon, an encoding method of the beacon, and a return delay time of the beacon.

14. The method of claim 13, wherein:
the beacon is modulated according to a modulation method of either On-Off-Keying (OOK) or Binary-Phase-Shift-Keying (BPSK).

15. A method of feeding power to an electronic device by an electromagnetic wave in a first frequency band, the method comprising:
transmitting a first electromagnetic wave for feeding power to the electronic device via the first frequency band; and
receiving a transmission signal from the electronic device via a second frequency band, the transmission signal including a modulated signal at least partly,
wherein the first electromagnetic wave is transmitted based on the transmission signal.

16. The method of claim 15, further comprising:
receiving the beacon from the electronic device via at least a part of the first frequency band, the beacon including an unmodulated signal at least partly,
transmitting the first electromagnetic wave based on the beacon; and
transmitting the first electromagnetic wave based on the transmission signal when receiving the beacon fails by several times.

* * * * *